United States Patent
Gurin et al.

(10) Patent No.: US 12,505,159 B1
(45) Date of Patent: Dec. 23, 2025

(54) ENTERPRISE PLATFORM WITH INTEGRATED USER-CURATED PLAYLIST

(71) Applicant: Block, Inc., Oakland, CA (US)

(72) Inventors: Daniel Gurin, Montreal (CA); Felipe Riso Bezerra Leite, Atlanta, GA (US); Daniel Pittack, San Francisco, CA (US)

(73) Assignee: Block, Inc., Oakland, CA (US)

( * ) Notice: Subject to any disclaimer, the term of this patent is extended or adjusted under 35 U.S.C. 154(b) by 133 days.

(21) Appl. No.: 18/073,236

(22) Filed: Dec. 1, 2022

(51) Int. Cl.
*G06F 16/68* (2019.01)
*G06Q 20/12* (2012.01)
*G06Q 20/20* (2012.01)
*G06Q 30/0601* (2023.01)

(52) U.S. Cl.
CPC ......... *G06F 16/686* (2019.01); *G06Q 20/202* (2013.01); *G06Q 20/12* (2013.01); *G06Q 30/0633* (2013.01)

(58) Field of Classification Search
CPC .............. G06F 16/686; G06Q 30/0633; G06Q 20/202; G06Q 20/12
USPC ......................................................... 705/21
See application file for complete search history.

(56) References Cited

U.S. PATENT DOCUMENTS

2018/0053244 A1* 2/2018 Hendlin ............. G06Q 30/0621

OTHER PUBLICATIONS

Mahoney, Jamie. Engaging Social Media Users: Understanding Online Interactions in a Retail Context. University of Northumbria at Newcastle (United Kingdom) ProQuest Dissertations & Theses, 2019. (Year: 2019).*

Ward, Christopher et al. Personalized radio: Using an integrated management system to uniquely personalize radio content. 2013 IFIP/IEEE International Symposium on Integrated Network Management, 2013. (Year: 2013).*

* cited by examiner

*Primary Examiner* — Fawaad Haider
(74) *Attorney, Agent, or Firm* — IP Spring

(57) ABSTRACT

A merchant processing system accesses a user interface of a content delivery service, to identify media content items. In response to merchant inputs, the merchant processing system causes generation of a playlist of media content items in a playlist format of the content delivery service. In response to determining that the user is accessing an application of the merchant, the merchant processing system causes display of the playlist to the user on a device associated with the user, within one or more screen displays of the application. The merchant processing system then receives a playback request representing a selection by the user of a media content item on the playlist, in response to the display of the playlist to the user, and causes transmission of the selected media content item to the device associated with the user, to cause playback of the selected media content item, based on the playback request.

20 Claims, 19 Drawing Sheets

STORE XYZ      Jukebox   Queue   Sign Out

Checkout

Submit your payment information to add your selection to the queue.

| Album | Title | Artist | Time |
|---|---|---|---|
| Album 1 | Title 1 | [Name] | 3:36 |

← 131

Cardholder Name
can

| 4111 1111 1111 1111 | 11/12 | 122 |

ⓘ Enter the security code

← 132

Total $1.00

Cancel      Submit Payment

ENTERPRISE PLATFORM WITH INTEGRATED USER-CURATED PLAYLIST

FIELD

At least one embodiment of the present disclosure pertains to techniques for providing access to media content over a network, and more particularly, to a technique for enabling a merchant to provide customers with access to third-party media content during a shopping experience.

TECHNICAL FIELD

Merchants who operate physical ("brick and mortar") businesses such as retail stores and restaurants commonly look for ways to increase customer foot traffic into their business establishments and to encourage customers to stay longer (since longer stays tend to encourage more purchases). Providing entertainment such as music to customers has long been a strategy employed by merchants for this purpose. For example, proprietors of restaurants and bars have traditionally hired live musicians or provided jukeboxes for their customers. Both of those types of entertainment tend to be expensive and take up space, which may be quite limited at very small establishments. Live bands also are generally only available on limited prescheduled dates and times and typically only play a fixed, predetermined set of songs. Jukeboxes allow on-demand selection of songs by customers, but can be difficult to reconfigure to provide a different music selection, and can require expensive repair or replacement.

The problem of increasing customer traffic is not limited to brick-and-mortar businesses. Online merchants also seek ways to increase customer traffic to, and engagement with, their online shopping websites.

BRIEF DESCRIPTION OF THE DRAWINGS

One or more embodiments of the present disclosure are illustrated by way of example and not limitation in the figures of the accompanying drawings, in which like references indicate similar elements.

FIG. 13 shows an example of a payment screen that can be used by a customer to purchase playback of a media item on a merchant's playlist, according to an implementation of the present subject matter.

DETAILED DESCRIPTION

Figure 1:
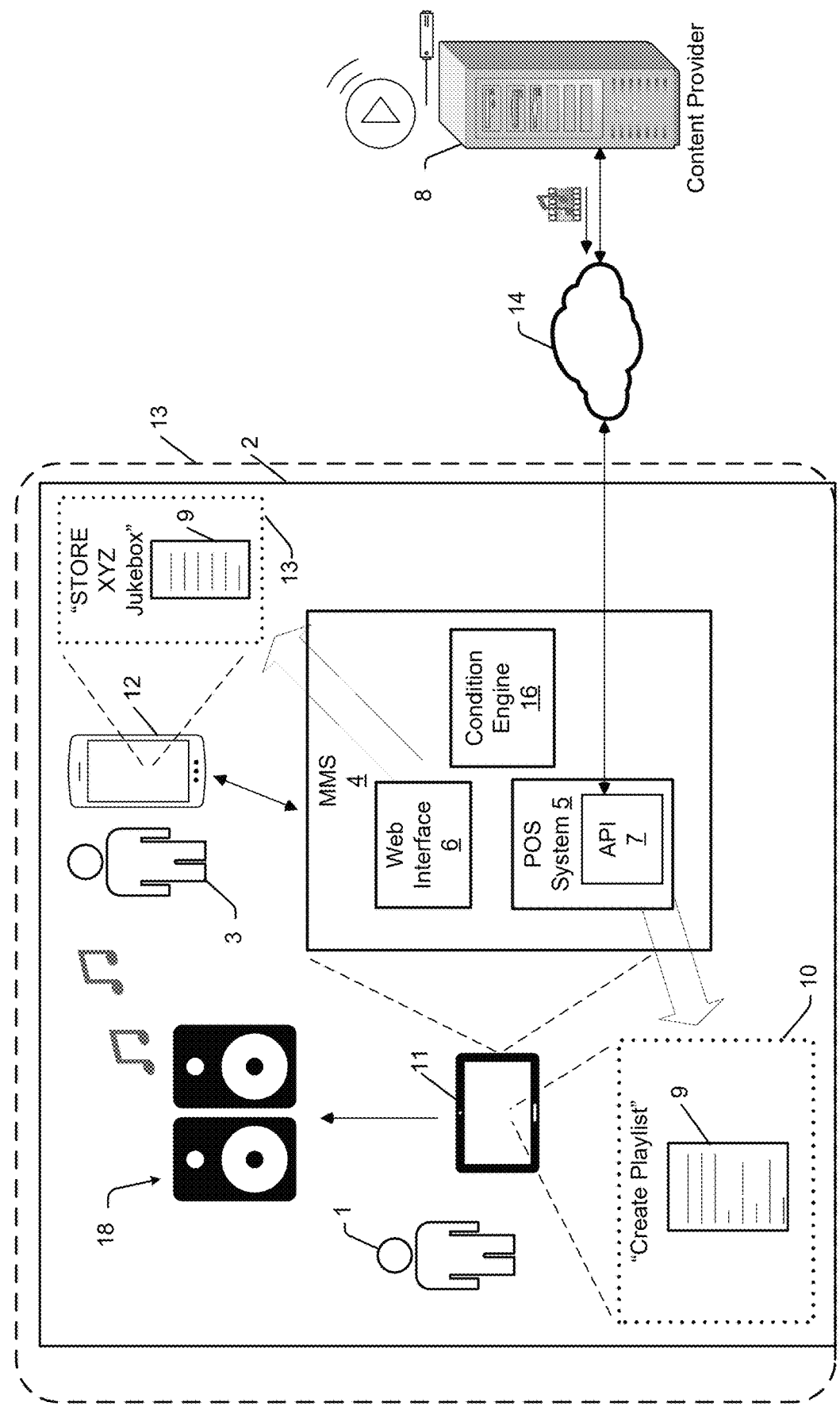
FIG. 1 shows an example of an environment in which a merchant curated playlist can be created and made available to the merchant's customers at a brick-and-mortar location, according to an implementation of the present subject matter.

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

Disclosed herein are methods and systems to integrate media functionality into e-commerce and/or physical merchant platforms are disclosed herein. In one implementation, the media functionality is integrated in response to a condition engine detecting that a media policy has been satisfied. The methods and systems described herein unlock media items (e.g., songs and videos) to select customers for access once the media policy is satisfied. The customers can access the unlocked content through a web or mobile application, or even through a physical point-of-sale operable by the merchant.

The techniques introduced here enable a merchant to create (curate) a playlist of media items from a third-party content provider, and make the playlist accessible to visitors of the merchant's brick-and-mortar business establishment and/or online shopping (e-commerce) website. Visitors of a merchant's brick-and-mortar site or online store can view the playlist and select media items to be played on demand, by using their own devices (e.g., smartphones, tablets or personal computers), while visiting the brick-and-mortar site or online store. The merchant-curated playlist optionally can be displayed to a customer on a device as a virtual jukebox, and may be displayed under the merchant's branding, such as the merchant's business name and/or logo (e.g., "STORE XYZ Jukebox"). In a brick-and-mortar scenario, selected media items can be queued and played through the merchant's sound system or audiovisual system. Hence, media items (e.g., songs, podcasts or videos) selected by different customers at the same physical location can be played in the order in which they are requested (or, if applicable, the order in which they are purchased). In an e-commerce scenario, a selected media item is played on a personal device operated by the customer who selected the media item (e.g., smartphone, tablet, personal computer).

In at least some embodiments, this technique is made possible by implementing an application programming interface (API) of the third-party content provider within a point-of-sale (POS) system of the merchant in the brick-and-mortar scenario, or within an e-commerce system of the merchant in the online shopping scenario. In either scenario, the merchant optionally may charge a fee for this service, which may be added to the customer's existing amount payable (e.g., to a restaurant or bar patron's tab, or to an online shopping buyer's shopping cart). By integrating the API of the third-party content provider within the merchant POS and/or e-commerce system, the techniques introduced here provide a streamlined mechanism for a merchant to provide media content tailored to the merchant's specific customers, even on a real-time scale based on individual customers who are currently shopping with the merchant. Additionally, by integrating the API of the third-party content provider within the merchant POS and/or e-commerce system, merchants are able to integrate payments (e.g., subscription fees and/or fees for individual content playbacks) seamlessly with both the third-party content provider and with customers of the merchant, without separate accounts, applications, hardware, or software to manage in addition to the rest of their business needs.

The content provider that provides the media items, can be, for example, a subscription-based digital media streaming service. Hence, the content provider may be a digital audio streaming service (e.g., for music and/or podcasts), a digital video streaming service, or a streaming service that provides streaming of various different types of digital media or multimedia. Such a streaming service may be subscription-based, so as to allow users to stream digital media items (e.g., songs, podcasts and/or videos) on-demand from a centralized library provided by the service. The content provider may provide its subscribers with the ability to create their own customized playlists of media items and to share them with other users. The content provider also may incorporate a recommendation engine to help users discover additional media items based on their listening or viewing history. Additionally, the media service provided by the content provider may allow users to cache at least some media items locally on the users' devices. The content provider may provide various types of payment plans, which may include tiered payment plans and/or quality plans (i.e., where users can pay more for better quality and/or lower-latency streaming).

Various optimizations of the techniques introduced here are possible. For example, in at least some situations, the identity of a customer may be known to, or ascertainable by, the merchant. As a more specific example, a customer may be a subscriber of the merchant's online shopping service who logs into an online shopping site of the merchant. The customer's identity can be ascertained from their login information. Alternatively, at a merchant's brick-and-mortar location, a computer system of the merchant may obtain identity information from a mobile device of the customer, such as the international mobile subscriber identity (IMSI), Mobile Subscriber Identification Number (MSIN), or other similar information. In at least some embodiments, the identity information may be requested and obtained from the customer's device in response to the customer crossing an electronic geo-fence to enter the merchant's brick-and-mortar location.

Whether in an online environment or in a brick-and-mortar environment, the obtained identity information can be used to develop information on the customer's media preferences when the customer makes selections from the merchant's playlist (e.g., specific songs, artists or genres). On subsequent visits by the customer to a site of the merchant, the same identity information or different identity information can be correlated with the customer's previously acquired preference information and used to customize which playlist or playlists are presented to the customer. In some instances, the merchant-curated playlist may be personalized for each individual customer whose identity is known to or ascertainable by the merchant. For example, a playlist displayed to a particular customer, Sue, may be displayed to her under a banner such as "Sue's Jukebox at STORE XYZ."

In some embodiments, a playlist can be curated by the merchant so as to encourage or discourage certain behavior. For example, a merchant may publish to customers a playlist of songs having a very fast beat during times when the merchant wants to encourage more buying. To better manage licensing rights to the various media items made available through the merchant's playlists, the merchant may track the number of customers that are in the store at any given time and/or during specific periods of time. This functionality can be facilitated by use of a geo-fence at a merchant's physical location. Additionally or alternatively, the merchant may track how many times each individual song is played, which may be useful for purposes of calculating licensing payment obligations and/or for purposes of determining user preferences (e.g., of individuals or groups).

Merchant's that operate brick-and-mortar venues having multiple rooms or spaces may allow their customers in each different room or space to select a different song. So for instance, Song A may be selected by Customer X to play inside a restaurant while Song B is selected by Customer Y to play on an outdoor patio at the restaurant. Further, a merchant may establish a different playlist for each different room or space in their venue. For instance, a restaurant operator may create a first playlist of quiet, relaxing music for their indoor dining room and a second playlist of louder, more upbeat music for their bar area.

The techniques introduced here are advantageous from a technical standpoint in several respects. For example, the technique improves and enhances the functionality of a merchant's POS system and/or online shopping site, by substantially automating the process of providing entertainment to customers in parallel with the customer's shopping experience, in a manner that does not require additional hardware or physical space in a brick-and-mortar environment. Further, the technique introduced here enables a merchant to retain full control over the media content and to receive payment for the media content. The techniques do so in a flexible manner that can be applied in either a brick-and-mortar environment or an online shopping environment. Moreover, by enabling payment for playing a media item to be combined with the payment for other goods or services, the technique can reduce network traffic associated with a particular customer's visit to a merchant site, i.e., by avoiding the need to send multiple payment transaction messages over a network to a card issuer or other financial entity. The techniques introduced here also create new and unique access channels between a user (e.g., a merchant and a customer) and media items, making media items that are otherwise inaccessible, accessible. The media items may be otherwise inaccessible due to limitations of the user's hardware devices, or software, such as mobile applications, executing on such devices. However, by creating condition-driven (e.g., geofence based) access, users' hardware devices and software can be configured to relay otherwise inaccessible media items provisionally.

As used in this description, the term "merchant" refers to any person or entity that provides a product or service as a business, and is intended to include any employee, contractor or other person acting on behalf of such person or entity. The term "seller" is used interchangeably with "merchant" in this description for convenience, and its use does not imply that a sale must take place. For example, a business entity that provides only services may still be referred to herein as a "seller," as can a business that only rents, leases or licenses products without actually selling them. Further, the terms "sale," "purchase" and variations thereof as used herein do not necessarily imply that a change of ownership must take place. Likewise, the terms "buyer," "customer," "consumer," and "patron" are used interchangeably for convenience to refer to any person who visits a site (physical or online) of a merchant, regardless of whether that person has an intent to purchase.

The techniques introduced here help a merchant increase customer engagement with a site of the merchant's business, which may be a physical ("brick-and-mortar") site or an online site (website), by enabling the merchant to provide playable media (e.g., music, videos, podcasts) to visitors of the merchant's site. The technique can be implemented by a merchant media system (MMS), as described further below, which can be implemented as part of a computer system owned and/or operated by the merchant, as a standalone system, or as a combination thereof.

In at least some embodiments, the technique includes enabling a merchant to define a customized playlist of media items (e.g., songs or videos) that are obtained or downloadable from a third-party content provider (also called a content delivery service), such as a streaming media service. The playlist can be in a standard format of a streaming media service of the content provider.

The preceding summary is provided for the purposes of summarizing some exemplary embodiments to provide an understanding of aspects of the subject matter described herein. Accordingly, the above-described features are merely examples and should not be construed as limiting in any way. Other features, aspects, and advantages of the subject matter described herein will become apparent from the following description of figures and claims.

As noted above, the technique introduced here can be implemented in either a physical (e.g., brick-and-mortar) environment or in a virtual (e.g. online shopping) environment. Turning now to the figures, FIG. 1 illustrates an example of how the technique can be implemented in a brick-and-mortar environment. A merchant 1 may conduct business at a physical location 2 (e.g., a retail store, restaurant, bar, or the like) that is accessible to customers 3 and may wish to allow their customers to listen to merchant-curated songs or view merchant-curated videos while visiting their location. Accordingly, the merchant 1 operates a merchant media system (MMS) 4, which is located at least partially at the merchant's location 2. The MMS 4 includes a point-of-sale (POS) system 5 of the merchant and a web interface 6. The POS system 5 allows the merchant 1 to track their inventory and process sales or services transactions, including the processing of card-based and/or cardless credit or debit payments. The POS system 5 may be implemented as a standalone hardware device, or as a software application that runs on a device of the merchant, such as a tablet computer, laptop computer, desktop computer, or other similar computer-based device.

In accordance with the technique introduced here, the POS system 5 implements one or more API(s) 7 of a media service provided by the content provider (CP) 8. The API 7 enables the merchant 1 to use their POS system 5 to access a catalog of artists and media items (e.g., songs) on the media service provided by the CP 8, and to create one or more customized playlists 9 from the available media items. This can be done through one or more screen displays 10 provided on a display device 11 that is part of or in communication with the MMS 4. The screen displays 10 may be generated locally by the POS system 5 based on information received from the CP 8. Alternatively, the screen displays 10 may be generated by the CP 8 and provided to the POS system 5, which then passes them to the display device 11. It is assumed that the merchant 1 is a subscriber of the media service provided by the CP 8. The created playlist(s) 9 can then be made available by the merchant 1 to their customers 3.

For example, a customer 3 enters the location 2 of the merchant carrying their mobile device 12, such as a smartphone, tablet or notebook computer. An interactive element such as a hyperlink or a quick response (QR) code may be displayed prominently at the merchant's location 2 where the customer 3 will likely see the interactive feature quickly after entering the location 2, with an appropriate message, such as "Use this QR code to get a list of great songs you can hear while shopping here at STORE XYZ!" The customer's activation of the interactive element with their mobile device 12 causes a message to be sent from the customer's mobile device 12 to the web interface 6 in the MMS 4, which responds by sending to the user's mobile device 12 the playlist 9 previously created by the merchant 1 as described above. The playlist 9 may be characterized as a virtual jukebox on a display screen 13 provided to the customer's device 12. The customer's device 12 may be any form of computing device, such as a smartphone, tablet computer, laptop computer, desktop computer, etc.

The customer's device 12 displays the playlist 9 to the customer 3, enabling the customer 3 to select a media item on the playlist, to be played. By providing the playlist 9 to the customer 3, the customer 3 is given conditional access to media content that would not otherwise be available to the customer 3 at the merchant's location. When the customer 3 selects a media item, they may then be taken through a payment process, in which the customer interacts with the merchant's POS system 5 via their mobile device 12 to complete the payment. When the payment process is complete, the MMS 4 places the selected media item into a playback queue, for playback by the merchant's sound system 18 or audiovisual system (as applicable). If the media item was previously requested relatively recently (e.g., within the last several hours, or a day or two, depending on an amount of memory available for caching), the media item may be cached locally in MMS 4 and played from its locally cached location. Otherwise, the media item may be downloaded via a network (e.g., the Internet) 14 from the CP 8.

In some embodiments and/or situations, the payment (if required) for playing a media item may not be required immediately, but instead may be added to an amount due from the customer. For example, if the business establishment is a restaurant or bar, payment for playing a media item may be added to the customer's tab and may be processed at the time the customer checks out. The POS system 5 can be configured to maintain each customer's tab.

The MMS 4 may include a condition engine 16 to evaluate one or more conditions to determine whether a predefined media policy is triggered. The condition engine 16 may be implemented in the form of, for example, fixed-function circuitry, or as programmed programmable circuitry. In certain implementations, the condition engine may be implemented as separate from the MMS 4. The condition engine 16 can apply one or more media policies to govern access to, and/or the contents of, the playlist 9. For example, the condition engine 16 can evaluate interactions with a geo-fence 15 that enables the MMS 4 or another system of the merchant 1 to determine when a customer enters, is present at or leaves their brick-and-mortar location. The condition engine 16 may include and/or apply one or more rules and/or machine learning models to determine which policy to apply in any given instance. In examples, a policy used for this purpose can be user-defined, or it can be learned by use of a trained machine learning model.

A "geo-fence," as the term is used herein, is a virtual geographic boundary, defined by a radiofrequency-based technology such as WiFi, global positioning system (GPS), RF identification (RFID), or the like, that enables software to trigger a response when a mobile device enters or leaves a particular geographic area. The response may include an electronic message to the merchant 1, to the customer 3, or both. The geo-fence 15 may be maintained by a local area wireless network (WLAN) system of the merchant 1, and may have the ability to identify individual mobile device users (e.g., from their mobile device IDs or mobile subscriber ID). In some embodiments, if the geo-fence 15 detects that a customer leaves the merchant's location 2 before the customer's selected media item is played, the media item can be removed from the playback queue, so that the selections of other customers who are still present can be advanced in the queue.

Information acquired through the geo-fence system and/or the MMS 4 can also be used to ascertain individual users' media preferences, based on their prior selections (e.g., specific songs and/or genres). Customized playlists may be delivered to certain individual customers according to their known user preferences, which for example may be inferred from their behavior (e.g., prior media selections) or expressly defined through user inputs. Additionally, the merchant 1 may maintain a database of playlist items that are selected, in order to determine overall customer preferences on a larger scale, such as by demographic group, time of day, day of the week, etc. Various types of algorithms may be used in order to set individual or combined policies and mechanisms to execute such policies for determining which of multiple merchant-curated playlists should be offered to a customer at any given time, such as averaging algorithms, machine-learning based algorithms, etc. For example, the condition engine 16 can apply a policy associated with timing, instead of or in addition to location, so that a certain playlist is accessible during certain months, e.g., during the holiday season. In another example, the condition engine 16 can apply a policy that is driven by a merchant attribute, such as coupons or loyalty programs, determined by accessing the merchant inventory or loyalty program, such that the playlist 9 is accessible and customized to a set of customers using the loyalty program or otherwise eligible for the loyalty program. In yet another example, the condition engine 16 can apply a policy driven by customer attribute, such as customer preference as described above, determined by accessing the customer database, such that the playlist is accessible and personalized to a set of customers. The condition engine 16 can also apply a policy driven by third-party data, such as social network activity, payment data, etc., to customize and adjust access controls to playlists for merchants and/or customers accordingly.

In one implementation, the condition engine 16 modifies the hardware and/or software capabilities of the customer's device 12 to enable access to the playlist 9. For example, the condition engine 16 can provide provisional (e.g., timed) access to the playlist through the merchant device 11 or software application and extend merchant access to the content onto the customer 3. This may involve adding the customer 3 as a subscriber to the merchant's subscription, albeit for a limited time period (until the customer is done shopping, for example). In another example, the condition engine 16 can extend playlist access to the customer 3 by sending customized widgets or deep links with targeted web content to the customer's device 12, to enable access to content that is otherwise inaccessible.

Figure 2:
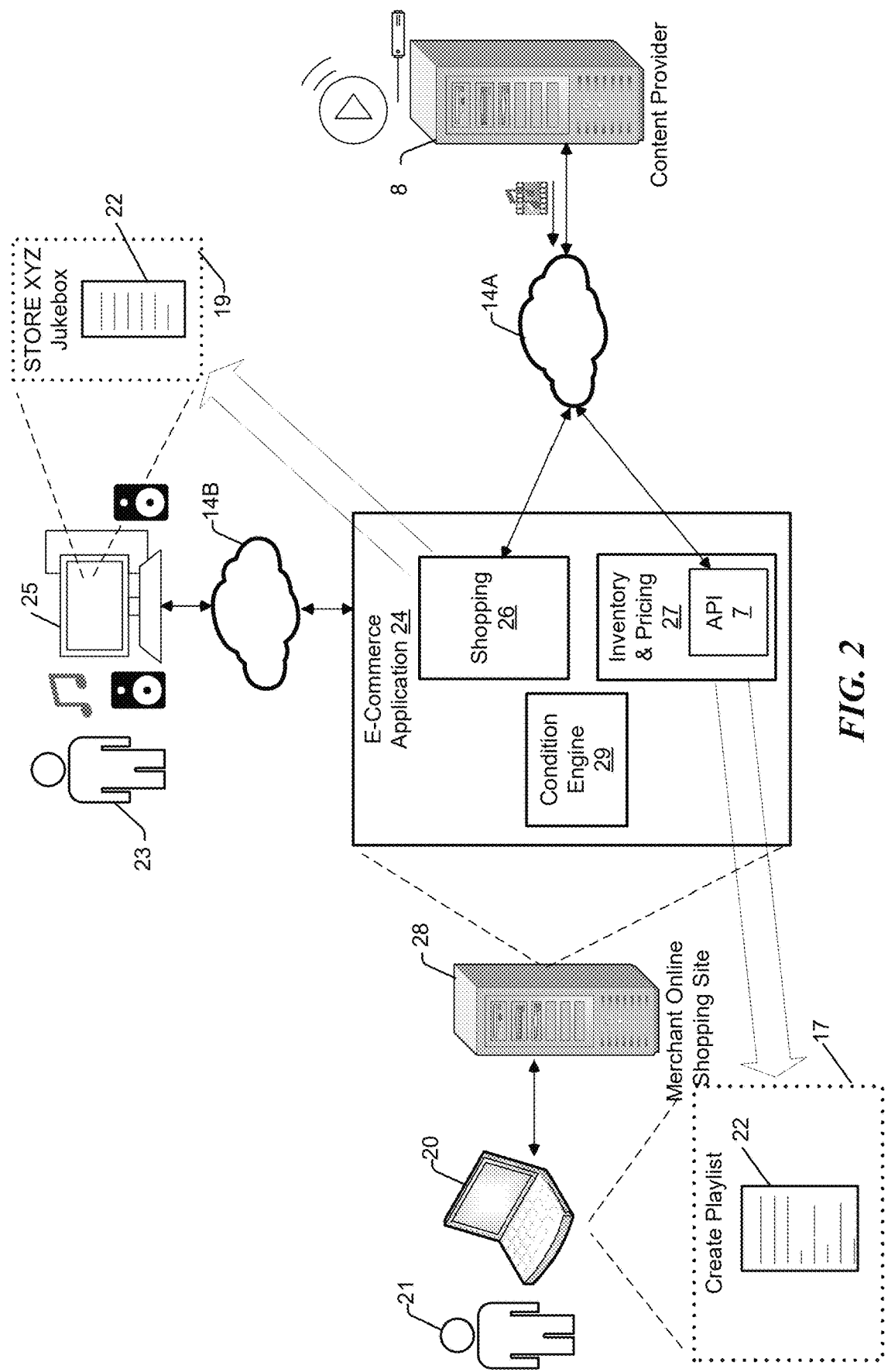
FIG. 2 shows an example of an environment in which a merchant curated playlist can be created and made available to the merchant's customers on an online shopping website, according to an implementation of the present subject matter.

FIG. 2 illustrates an example of how the technique introduced here can be implemented in an online environment. Specifically, a merchant 21 may operate a server 28 that provides an online shopping site (online store) and may wish to allow online shoppers (such as customer 23) to listen to merchant-curated songs and/or to view merchant-curated videos items while visiting the online shopping site. Note that the merchant 1 in this scenario may also operate one or more brick-and-mortar locations, any of which may include an MMS 4 such as described above.

In the configuration of FIG. 2, there is no on-premises MMS; rather, the MMS 4 takes the form of, or is replaced by, an e-commerce application 24 of the merchant 21; and selected media items are played back on the user's own device 25 at any location where the user has Internet connectivity, rather than at a physical location of the merchant.

The e-commerce application 24 includes modules that enable the merchant to make an online sale, for example, a shopping module 26 and an inventory and pricing module 27. The inventory and pricing module 27 can be a software module that allows the merchant 21 to track and edit the merchant's online inventory, set prices for their products or services, and customize how their products or services are displayed in an online catalog, to name a few examples. The shopping module 26 can be a shopping cart application that enables customers to select products from the online catalog and purchase the selected products.

In various implementations, the inventory and pricing module 27 also implements one or more API(s) 7 of the CP 8 (in that respect being similar to the POS system 5 in FIG. 1), which enables the merchant 21 to create a playlist 22 of media items from the CP 8. The API 7 enables the merchant 1 to use their e-commerce application 24 to access a catalog of artists and media items (e.g., songs) on the media service provided by the CP 8, and to create one or more customized playlists 22 from the available media items. These actions can be done through one or more screen displays 17 provided on a display device 20 that is part of or in communication with the merchant online shopping site 28. The screen displays 17 may be generated locally by the e-commerce application 24 based on information received from the CP 8. Alternatively, the screen displays 17 may be generated by the CP 8 and provided to the e-commerce application 24, which then passes them to the display device. It is assumed that the merchant 21 is a subscriber of the media service provided by the CP 8. The created playlist(s) 22 can then be made available by the online shopping module 26 to the merchant's customers 23 via a network, such as the Internet. In at least some embodiments, the playlist creation and editing functionality, including the API(s) 7 of the CP 8, can be incorporated into a website editor tool designed to enable a merchant to create and/or edit the merchant online shopping site 28.

The shopping module 26 may also include one or more API(s) of the CP 8 to enable a customer (online shopper) 23 to provisionally (e.g., through operation of a condition engine 29) access the playlist 22 via one or more networks 14B (e.g., the Internet) and view the playlist 22 on their own device 25, and to select media items for playback on that device. In some embodiments, the playlist 22 (which may also be called a virtual jukebox) may be made accessible to the customer 23 on multiple pages of the merchant's online shopping site 28, for example, on various different pages of the merchant's online catalog and the shopping cart page. The playlist 22 may be characterized as a virtual jukebox on a display screen 19 provided to the customer's device 25. The customer's device 25 may be any form of computing device, such as a smartphone, tablet computer, laptop computer, desktop computer, etc.

The customer's device 25 displays the playlist 22 to the customer 23, enabling the customer 23 to select a media item on the playlist, to be played. By providing the playlist 22 to the customer 23, the customer 23 is given conditional access to media content that might not otherwise be available to the customer 23. When the customer 23 selects a media item from the playlist 22, the customer 23 may be taken through a payment process, in which the customer interacts with the merchant's online shopping application 26 via their device 25 to complete the payment. Alternatively, the merchant 21 may choose to provide customers with access to media items on the playlist 22 for free, or may defer requiring payment until the customer goes through a checkout process to pay for other items purchased through the online shopping application 26.

The state of the customer's selections can be persisted as the customer navigates through different pages of the merchant's online site, including through the checkout process on the shopping cart page. To accomplish this, a token can be created for each customer, and passed as state information from one webpage to another as the customer navigates the online shopping site.

Playing of a selected media item may be commenced immediately upon its selection, or after the payment process (if any) is complete, according to the merchant's preference (as may be specified in a configuration setting). The selected media item may be downloaded via one or more networks (e.g., the Internet) 14A from the CP 8, or if the selected media item is present in a local cache associated with the merchants online shopping site 28, the selected media item may be played from the cache.

In one implementation, a condition engine 29 in the e-commerce application 24 tracks the customer's behavior across the merchant's online shopping site 28 and verifies whether a media policy has been triggered. For example, a media policy may be triggered based on customer's website interaction (e.g., through cookies, or through application of coupons, etc.), and accordingly, access to certain playlists and embedded media content may be unlocked. In some embodiments the condition engine 29 may be implemented as separate from the e-commerce application 24.

Figure 3:
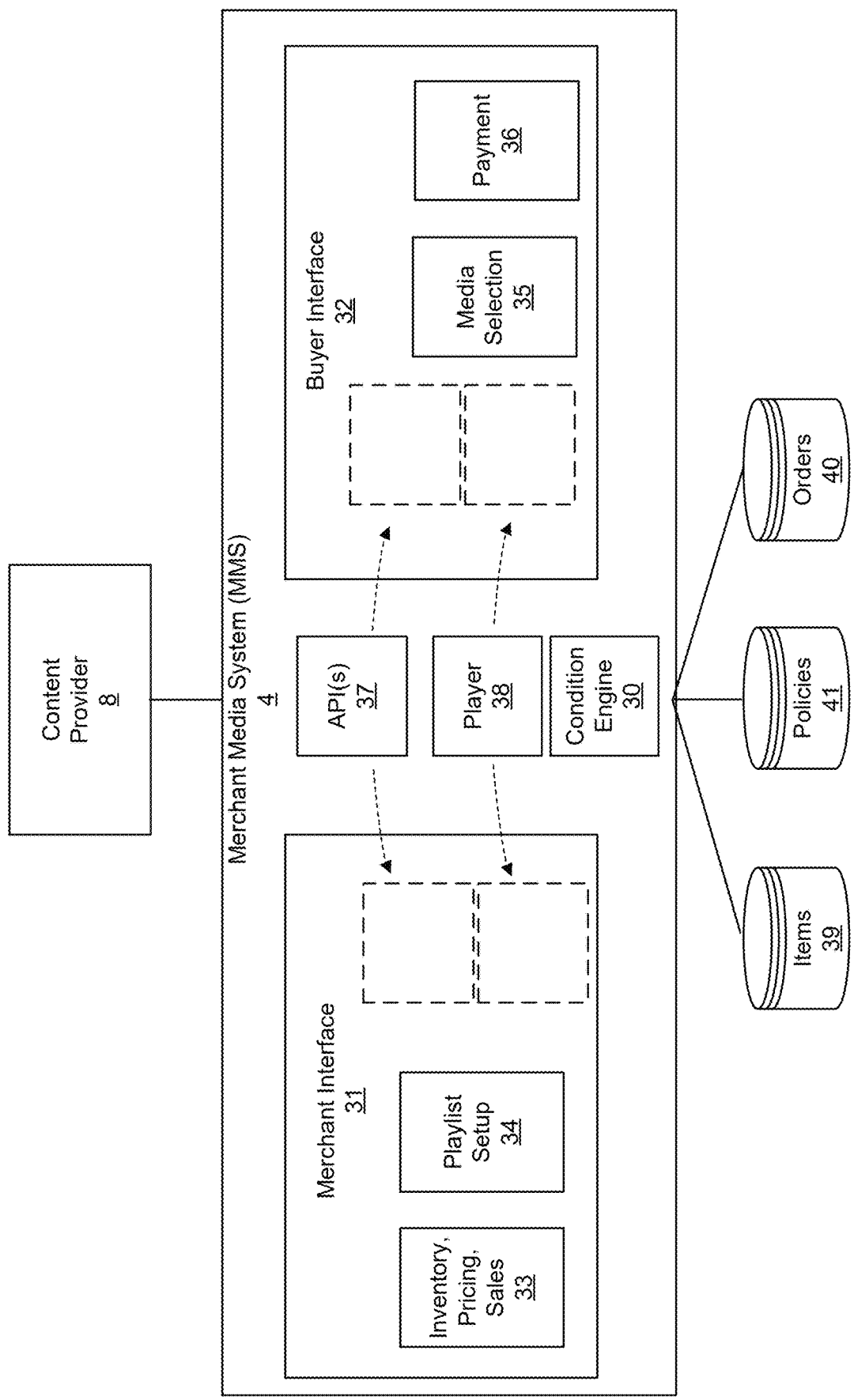
FIG. 3 shows an example of the functional elements of a merchant media system (MMS), according to an implementation of the present subject matter.

FIG. 3 illustrates an example of the functional elements of the MMS 4 according to at least some embodiments. As shown, the MMS 4 includes, for example, a merchant interface 31, a customer interface 32 and a condition engine 30. The merchant interface 31 is responsible for interacting with the merchant, whereas the customer interface 32 is responsible for interacting with customers of the merchant. The condition engine 30 evaluates various conditions (e.g., as defined in one or more policies) for purposes of determining access to, or the contents of, playlists.

The merchant interface 31 includes, for example, an inventory, pricing and sales module 33 and a playlist set-up module 34. The customer interface 32 includes, for example, a media selection module 35 and a payment module 36. In a brick-and-mortar embodiment, the merchant interface 31 can be a POS system of the merchant, such as the POS system 5 in FIG. 1, and the customer interface 32 can be a web interface, such as the web interface 6 in FIG. 1. In an online environment, the merchant interface 31 can be the inventory and pricing module 27 shown in FIG. 2, and the customer interface 32 can be the shopping application 26 shown in FIG. 2.

The inventory, pricing and sales module 33 can include software code for performing management of inventory and pricing, and for executing sales transactions. The playlist setup module 34 enables the merchant to create and edit playlists of media items available from the CP 8, as described above. Hence, after a playlist is created, songs can be added to the playlist or removed from the playlist, at the merchant's discretion. In the customer interface 32, the media selection module 35 enables the customer to view a merchant created playlist and select one or more media items from the playlist, for playback.

The payment module 36 is responsible for receiving payment information from the customer. In a brick-and-mortar embodiment, the payment module 36 may coordinate with the inventory, pricing and sales module (e.g., POS system) 33 in the merchant interface 31 to complete a payment.

In various embodiments, the MMS 4 also includes one or more APIs 37 of the CP 8, which can be implemented in the merchant interface 31, the customer interface 32, or both. For example, an API 37 of the CP 8 may be implemented in the merchant interface 31 to facilitate creation and editing of playlists by the merchant. In some embodiments, such an API may be implemented within the playlist setup module 34 itself. Similarly, in some embodiments an API 37 of the CP 8 may be implemented within the customer interface 32, for example to facilitate playback of media items.

Additionally, the MMS 4 includes a media player 38, which can be implemented in the merchant interface 31, the customer interface 32, or both, depending on the intended use of the particular embodiment. For example, in a brick-and-mortar embodiment, the media player 38 can be implemented in the merchant interface 31 to cause playback through a local sound system or audiovisual system of the merchant. On the other hand, in an online environment the media player 38 may be implemented in the customer interface 32 to facilitate playback on a customer's device via a network.

In at least some embodiments the MMS 4 includes or has access to an Items database 39, an Orders database 40 and a policies database 41. The policies database 41 stores one or more policies (e.g., rules) that enable the MMS 4 to provide a more customized experience for individual customers or categories of customers. For example, a policy may specify a particular music genre, and a particular playlist that includes media items of the particular genre, to be provided to customers during certain hours of the day (e.g., pop music during the daytime, smooth jazz in the evening). As another example, a policy may be based on the past history of a particular customer's song selections and may cause a particular playlist including a song previously selected or most frequented by the customer to be displayed to the customer.

The Items database 39 stores various Items, where an Item in this context can be a data object normally used by a merchant computer system (e.g., POS system or e-commerce system) to represent and store a catalog of products. In the technique introduced here, however, an Item can also be used to represent a merchant-curated playlist of media items. The Orders database 40 stores various Orders, where an Order in this context can be a data object normally used by a merchant's computer system (e.g., a POS system or e-commerce system) to represent and/or store information for use in executing a payment transaction, such as a list of purchased products, taxes, any applicable discounts, and payment information. In the technique introduced here, however, an Order is used in a similar manner, but can also include a link to a media item (e.g., a song or video) selected for purchase from a merchant-curated playlist.

Figure 4:
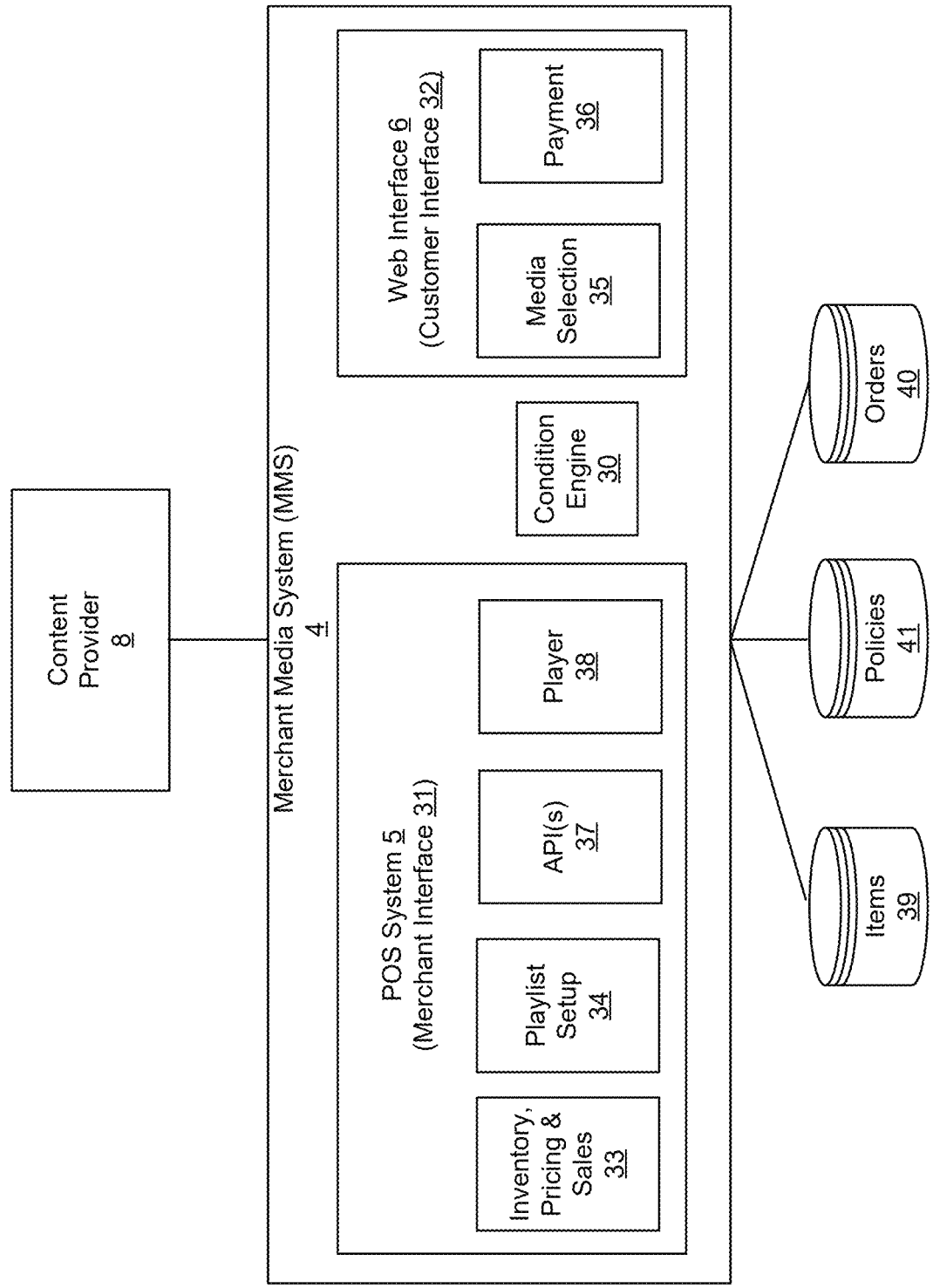
FIG. 4 shows an example of a variation of the MMS of FIG. 3 for and brick-and-mortar environment, according to an implementation of the present subject matter.

FIG. 4 illustrates a variation of the system in FIG. 3, designed for use in a brick-and-mortar embodiment. In this embodiment, the merchant interface 31 is the merchant's POS system (e.g., POS system 5 in FIG. 1), and the customer interface 32 is a web interface, (web interface 6 in FIG. 1). The POS system 31 includes inventory, pricing and sales module 33, playlist setup module 34, media player 38, and one or more APIs 37 of the CP. The web interface 32 contains media selection module 35 and payment module 36.

In an example, a coffee shop merchant utilizes the playlist setup module 34 of the merchant's POS system 5 to create multiple playlists. The playlists may be created by use of an API 37 of the CP 8 and may include songs accessible via an API 37 by the POS system 5. In this example, the coffee shop merchant may create a first playlist including relatively upbeat music for use during mornings and early afternoons, and a second playlist including more relaxing music for use during late afternoons and evenings.

At some later date, a customer enters the merchant's coffee shop during the late afternoon. The customer sees an interactive element displayed prominently at the merchant's coffee shop, such as a QR code displayed on the customer's table with the message, "Scan this QR code to see a list of great music you can hear while enjoying your coffee!" The customer scans the QR code with the customer's smartphone, which causes a request to be sent from the customers smartphone to the merchant's web interface 6. The web interface 6 receives the request and, in response, invokes its media selection module 35 to look up the appropriate playlist to provide. The condition engine 30 may determine, based on the time of day, that (in this example) the second playlist (containing relaxing music) is the appropriate playlist to provide to a customer in this particular instance. Accordingly, the media selection module 35 sends the second playlist to the customer's smartphone, for display to the customer. The customer peruses the displayed playlist on the customer's smartphone, and then selects a song to play (e.g., by tapping on it on the display). Upon selecting a song, the customer is taken through a payment process by the payment module 36 in the web interface 6. Upon completion of payment for the song, the selected song is added to a playback queue, to be played by the player 38 through the merchant's coffee shop's sound system.

Figure 5:
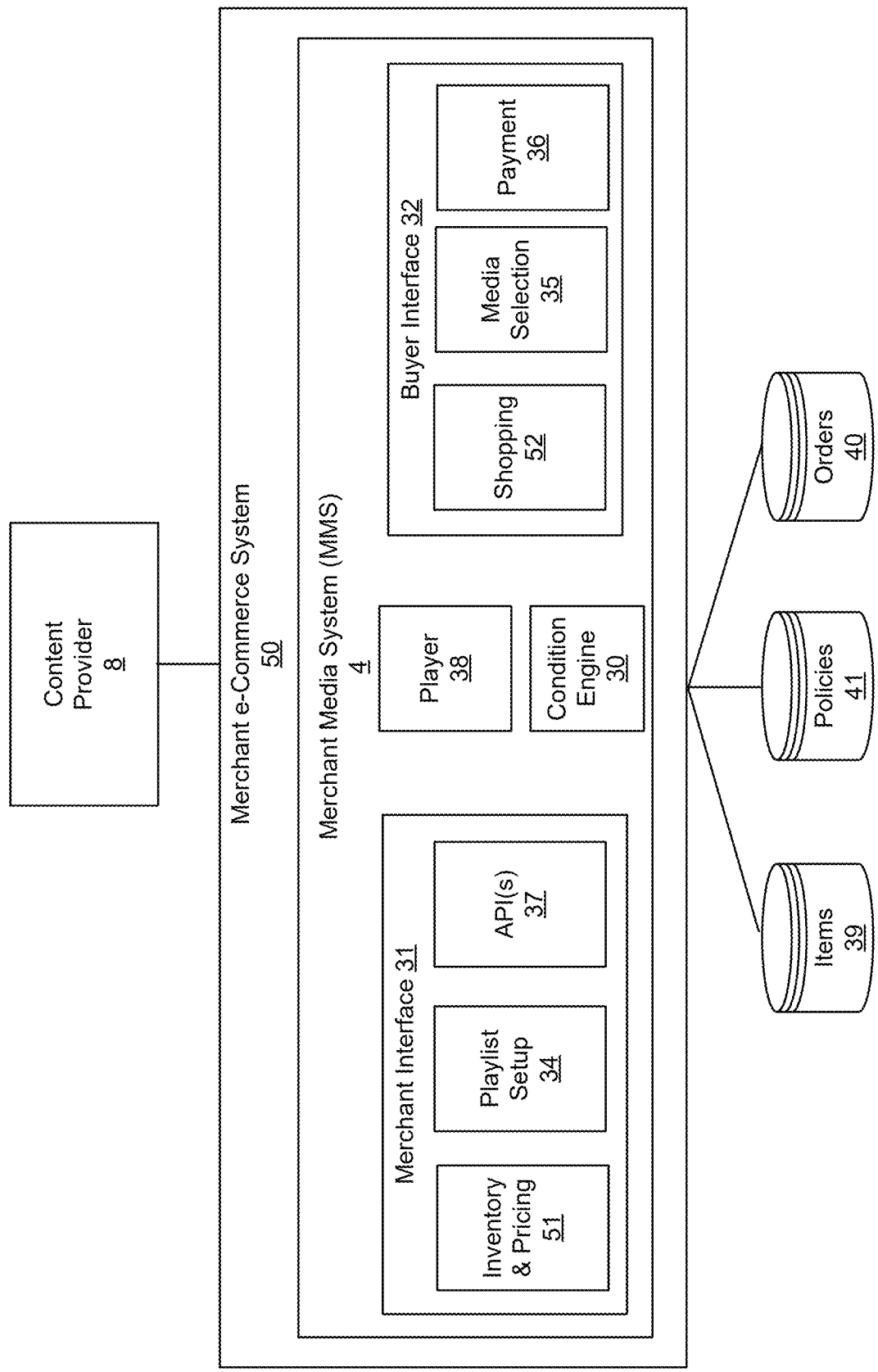
FIG. 5 shows an example of a variation of the MMS of FIG. 3 for an online shopping environment, according to an implementation of the present subject matter.

FIG. 5 illustrates a variation of the system in FIG. 3, designed for use in an online shopping embodiment. In this embodiment, the MMS 4 is implemented within a merchant's e-commerce system 50. In certain embodiments, the MMS is implemented at least partly within a website editor designed to allow a merchant to create and edit an online shopping site. In relevant detail the embodiment of FIG. 5 is similar to that of FIG. 4, except that the sales functionality is included in the customer interface 32, in the form of shopping module 52, rather than as a POS system in the merchant interface 31, not in the inventory and pricing module 51. Also, the media player 38 can be shared between the merchant interface 31 (e.g., to allow the merchant to play media items during playlist creation) and the customer interface 32 (e.g., to playback media items purchased by the customer from the playlist created by the merchant).

In an example, a clothing merchant may maintain an e-commerce system 50 to implement an online shopping website, where the e-commerce system 50 includes the MMS 4. The merchant may utilize the playlist setup module 34 of the merchant interface 31 of the MMS 4 to create multiple playlists. The playlists may be creatable using an API 37 of the CP 8 and may include songs accessible via an API 37 by the merchant interface 31. In this example, the online merchant may create a first playlist including music from the 1980s and 1990s and a second playlist including music from year 2000 and later.

At some later time, a customer accesses the merchant's online shopping site and begins viewing descriptions of clothing items for potential purchase, which is made possible by the shopping module 52 in the buyer interface 32. The condition engine 30 detects this event and, in response, looks up the customer's music preferences acquired from prior visits to the merchant's online site, and for example, determines that the customer likes to hear 1980s music. As a result, the condition engine 30 signals the media selection module 35 of the buyer interface 32 of the MMS 4 to select the first playlist for the customer.

In response to the signal from the condition engine 30, the media selection module 35 access the first playlist and sends the first playlist to the customer's device (e.g., a personal computer) over a network (e.g., the Internet), for display to the customer on the same web page that contains product descriptions that the customer is viewing. The customer peruses the displayed playlist on his or her device, and then selects a song to play. Upon selecting a song, the customer optionally may be guided through a payment process by the payment module 36 in the buyer interface 32 (if payment is to be required at all). Upon completion of payment for the song—or if payment is not required, upon selection of the song—the song is played by the player 38 via the customer's local device. Note that the customer device may also include a client-side player (not shown), to facilitate playback. In examples, the player 38 is integrated with the merchant's online shopping site and may not utilize a specific client-side player to facilitate playback.

Figure 6:
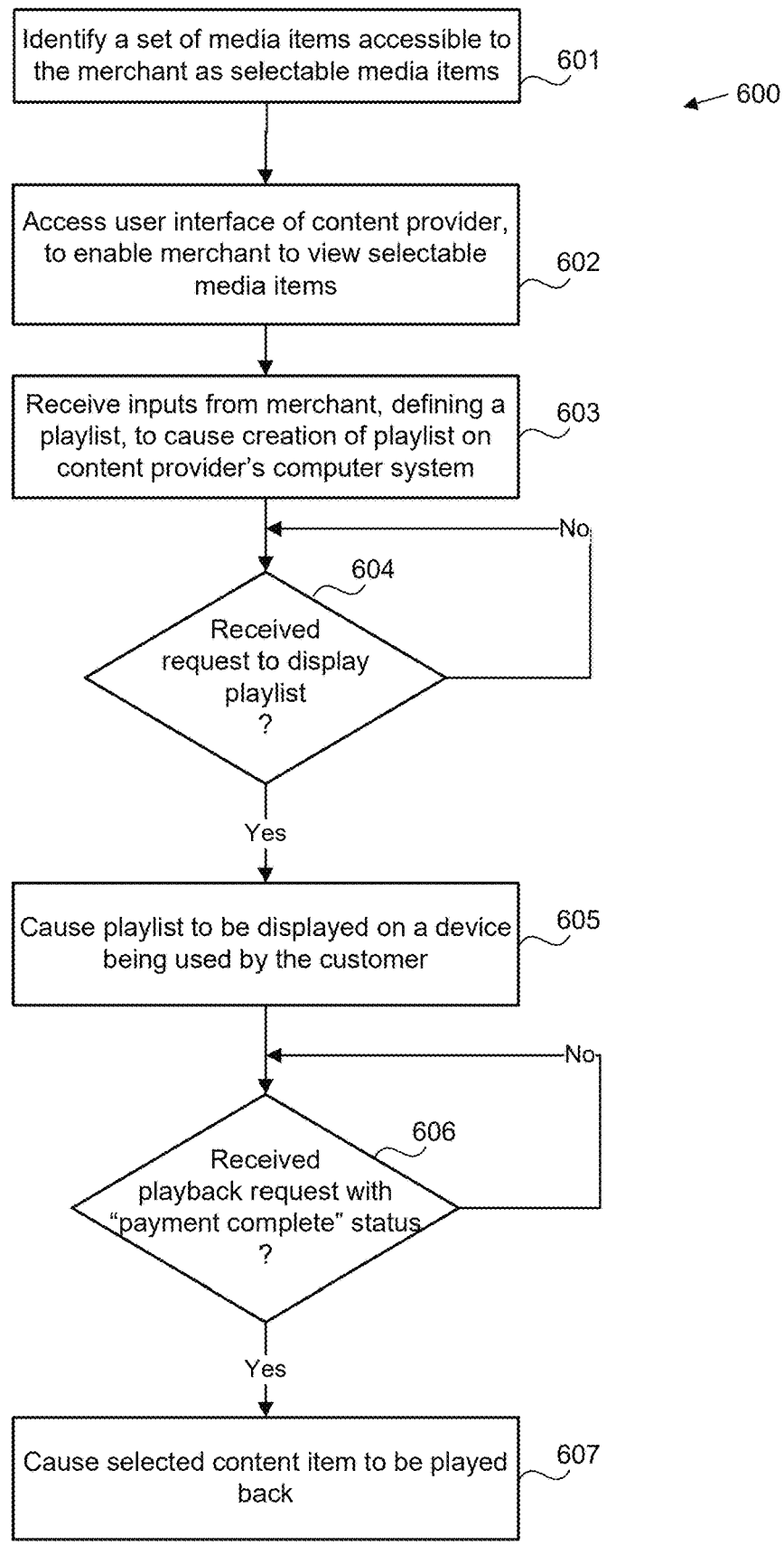
FIG. 6 is a flow diagram illustrating an example of an overall process performed by the MMS, according to an implementation of the present subject matter.

FIG. 6 illustrates an example of a process that may be executed in accordance with the technique introduced here. The order in which the operations are described is not intended to be construed as a limitation, and any number of the described operational blocks can be deleted, moved, added, subdivided, combined, and/or modified in any order to implement the methods, or an alternative combination or sub-combinations. Also, while steps, sub-processes or blocks are at times shown as being performed in series, some steps, sub-processes or blocks can instead be performed in parallel, or can be performed at different times as will be recognized by a person of ordinary skill in the art. Further any specific numbers noted herein are only examples; alternative implementations can employ differing values or ranges.

Initially, at step 601 a set of media items accessible to the merchant is identified as selectable media items. The set of media items can be, for example, all of the media items that are accessible to the merchant under the merchant's subscription to a media service provided by a content provider (CP), such as the CP 8. For example, referring to FIG. 3, step 601 can be performed by the merchant interface 31 of the MMS 4, by implementing an API 37 of the CP 8. Next, at step 602, a graphical user interface (GUI) of a content provider is accessed to enable a user, e.g., a merchant, to view the selectable media items. For example, the merchant interface 31 can access a GUI generated by the CP 8, to enable the merchant to view the selectable media items. As noted above, this can be accomplished by the merchant interface 31 of the MMS 4 implementing one or more APIs 37 of the CP 8.

At step 603, inputs are received from a merchant, defining a playlist, to cause creation of the playlist on the CP's computer system. For example, the merchant interface 31 of the MMS 4 receives inputs from a user, e.g., the merchant, that define a playlist, to cause creation of the playlist on a server system of the CP 8, via the API 37.

At step 604, verification is performed of whether a request from a customer's device to display the playlist on a user interface of the customer device has been received. For example, referring to FIG. 1, the web interface 6 of the MMS 4 verifies whether the customer 3 has interacted with an interactive element (e.g., a QR code) using the customer's mobile device 12, as a request to display the playlist 9 on a display screen 13 of the customer's mobile device 12. When such a request is received ("Yes" branch), then in response, at step 605 the playlist is caused to be displayed on the device being used by the customer. For example, the web interface 6 sends display data (e.g., a web page) to the customer's device 12 to cause the customer's device 12 to display the playlist 9.

In any given instance, one or more policies may be used to govern which particular playlist or playlists are made accessible to a customer, or the particular contents of any given playlist. Policies used for this purpose may be created expressly (e.g., by user inputs from a merchant), or automatically by a computer system (e.g., the MMS 4). The condition engine 30 of the MMS 4 may determine whether and when a given policy is satisfied.

After causing the playlist to be displayed on the device being used by the customer, at step 606 a verification is performed of whether an indication of a playback request has been received from the device being used by the customer, with an associated "payment complete" status. For example, the player 38 in the MMS 4 may verify whether a playback request with "payment complete" status has been received. When such an indication has been received ("Yes" branch), then at step 607 the selected content item is caused to be played back. In a brick and mortar implementation, step 607 may involve the player 38 adding the selected media item to a playback queue, for playback by a sound system or audiovisual system of the merchant at the merchant's location. In an e-commerce implementation, step 607 may involve the player 38 transmitting the selected media item 2 a remote device of the customer over a network 14B (FIG. 2), such as the Internet.

Figure 7:
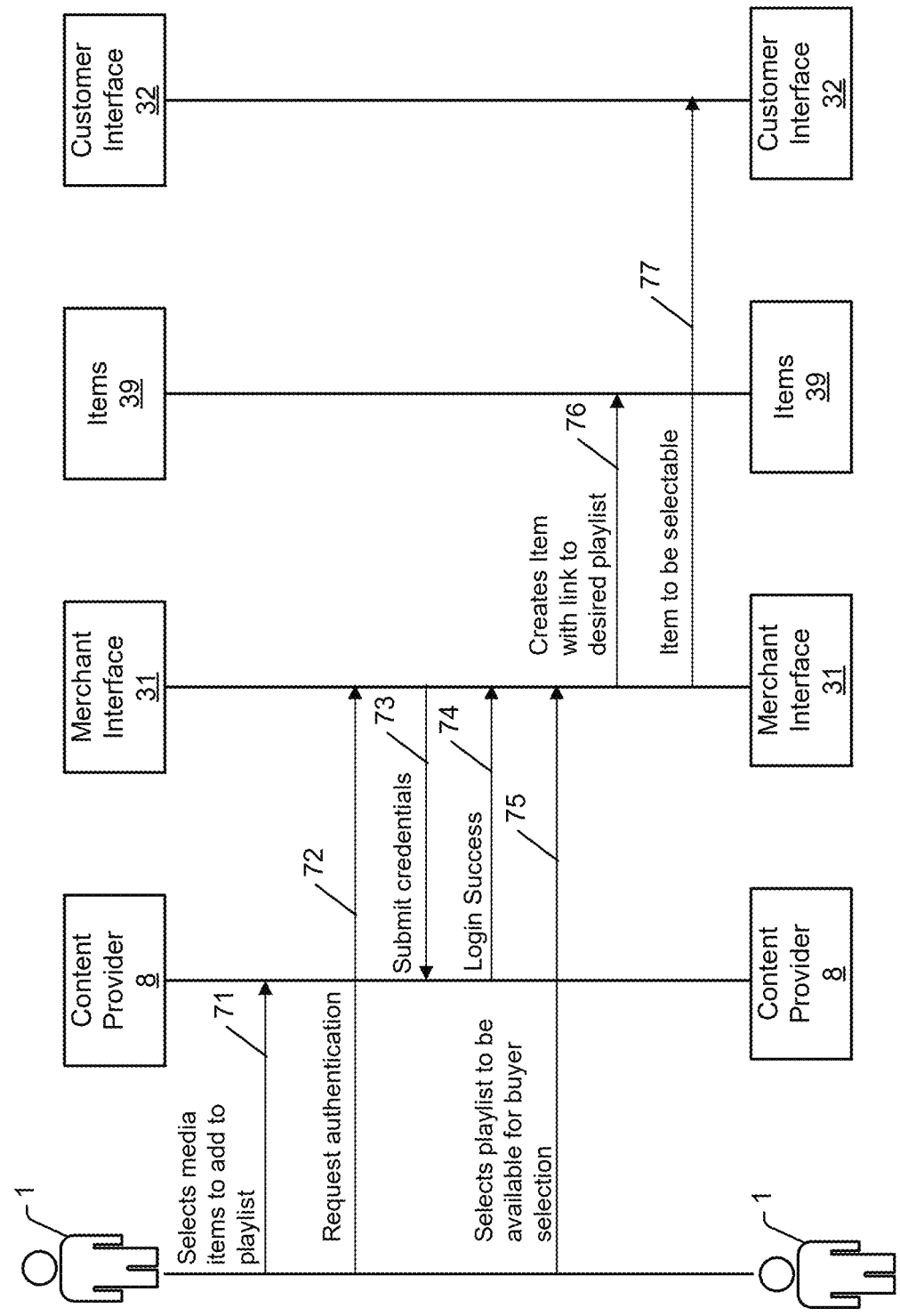
FIG. 7 shows an example of a sequence of messages between various entities in connection with a merchant's creating a playlist, according to an implementation of the present subject matter.
Figure 8:
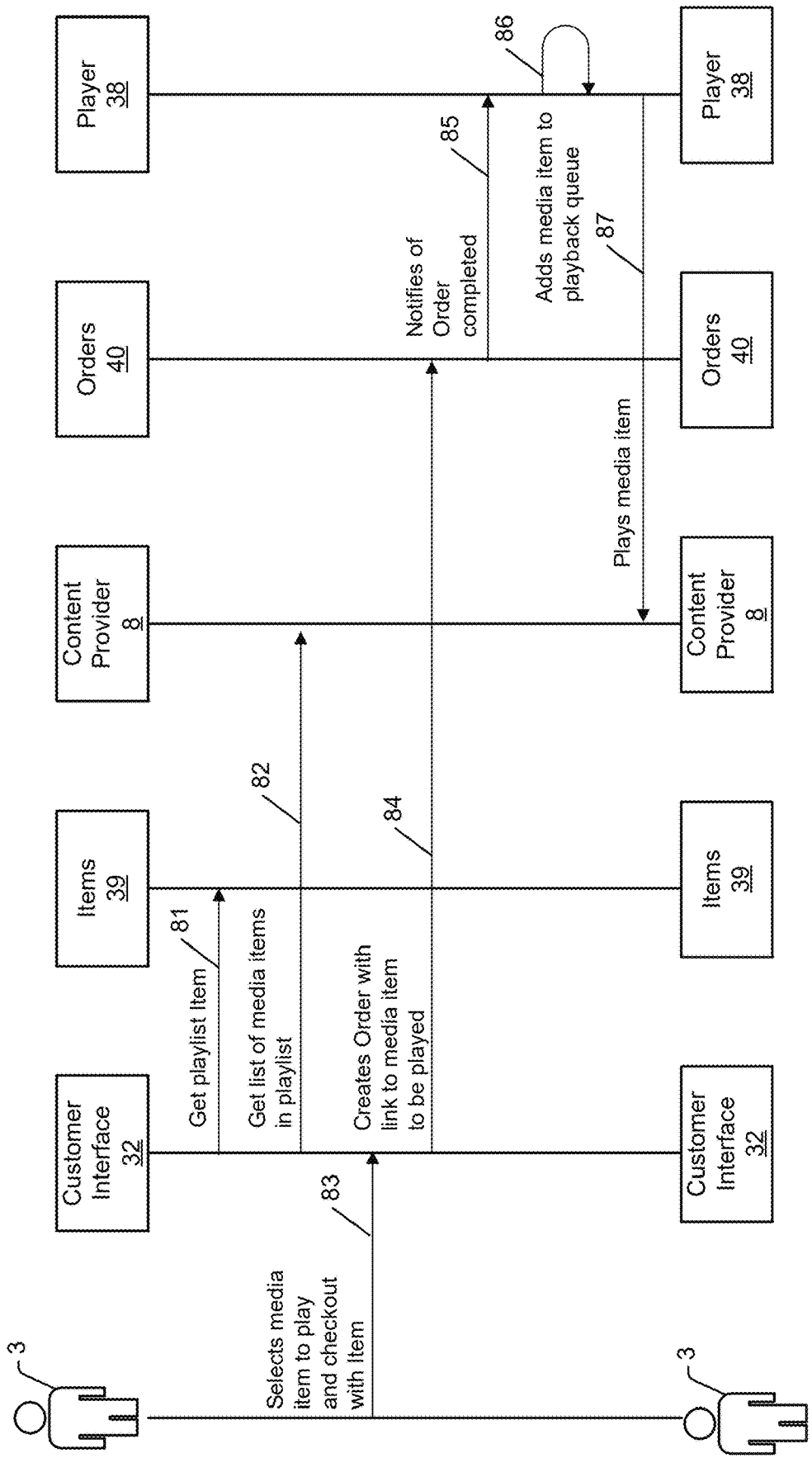
FIG. 8 shows an example of a sequence of messages between various entities in connection with a customer's selection of a media item from a merchant's playlist, according to an implementation of the present subject matter.

An example of the operation of the MMS 4 is now further described in reference to FIGS. 7 and 8. In particular, FIG. 7 shows an example of a sequence of messages between the relevant entities in connection with a merchant's creating a playlist. FIG. 8 shows an example of a sequence of messages between the relevant entities in connection with a customer's selection of a media item from a merchant's playlist, for playback. FIGS. 7 and 8 are each applicable to, are applicable to both a brick-and-mortar embodiment and an e-commerce embodiment.

Referring first to FIG. 7, when the merchant 1 wants to create a playlist, the merchant initially uses the merchant interface 31 of the MMS to access 71 a website of the CP 8, in order to view the available media items (e.g., songs by various artists) and select a media item to be added to the playlist. As explained above, in a brick-and-mortar embodiment the merchant interface 31 may include a POS system of the merchant, whereas in an online embodiment the merchant interface may be part of an online shopping application of the merchant or a website editor tool for creating an online shopping website.

The merchant 1 then requests authentication 72 with the CP 8 via the merchant interface 31. For example, the authentication request may be triggered by the user inputting a command after selecting the desired media items, such as clicking on a link or button labeled "Save Playlist" or the like. In response to the authentication request 72, the merchant interface submits the merchant's login credentials 73 (e.g., username and password) to the CP 8, which responds with a login success message 74 (assuming the merchant is an authorized subscriber of the CP's media service). Once the merchant 1 has been authenticated by the CP 8, the merchant 1 uses the merchant interface 31 to select the playlist (which may be a selection from amongst multiple playlists created by the merchant), to make the playlist available to customers of the merchant 1. In response to this action, the merchant interface 31 creates and stores 76, in the Items database 39, an Item (data object) containing a link to the desired playlist. Each media item in an Item representing the playlist contains an identifier and a link to the associated media item on the CP's media service. Once the Item has been created and stored, the merchant interface 31 sends a message 77 to the customer interface 32 identifying the Item that represents the playlist as being selectable by customers.

FIG. 8 shows an example of a sequence of messages in connection with a customer's selection of a media item from a merchant's playlist, for playback. Initially, in response to a predetermined trigger event, the customer interface 32 of the MMS gets 81 the previously created playlist Item from the Items database 39. The predetermined trigger event may be, for example, a customer's activation of an interactive element such as a QR code or hyperlink from their mobile device in a brick-and-mortar environment, or clicking a link or logging on in an e-commerce embodiment. The customer interface 32 then accesses the website of the CP 8 to obtain 82 (at least) identifying information of the media items included in the playlist item. In some embodiments or scenarios, the customer interface 32 may also obtain at least some of the actual media items from the CP at this time, if they are not already cached in the MMS. The customer then views the merchant's playlist on their device (e.g., a smartphone, tablet or personal computer), selects from the playlist 83 a media item (e.g., a song) to be played, and then goes through a payment checkout process.

In response to completion of the checkout process, the customer interface 32 creates and stores 84, in the Orders database 40, an Order (data object) including a link to the media item to be played.

In response to creation and storage of a new Order, the Orders database 40 notifies 85 the media player 38 of the completed Order. Alternatively, the media player 38 may be configured to search the Orders database 50 for orders that show a fulfillment status of "completed." In response to such notification 85 (or finding a "completed" Order), the media player 38 adds 86 the selected media item to the playback queue. In some embodiments, when the media item comes to the front of the queue, the media player 38 signals the CP 8 to begin downloading the media item to the media player 38, which is then played 87 by the media player 38 in streaming mode. In other situations, such as when the media item is already cached locally in the MMS, the media player 38 may simply access the media item from a local cache and play it. In some situations, if the media item is not in the local cache at the time the media item is added to the playback queue, the media player 38 may download the media item from the CP 8 before the media item comes to the front of the queue, for example, to avoid latency issues.

FIGS. 9 through 14 illustrate examples of various display screens that may be displayed, or caused to be displayed, by the MMS during its operation. In general, these examples are applicable to either a brick-and-mortar environment or an e-commerce environment. For purposes of this description, it can be assumed that the merchant is a subscriber of a streaming music service and wishes to create a playlist with songs that can be purchased for playback by the merchant's customers (either online or at a brick-and-mortar location). The merchant can use the merchant interface 31 of the MMS 4 to log on to the merchant's home page on the streaming media service and navigate to a screen for creating or editing playlists.

Figure 9:
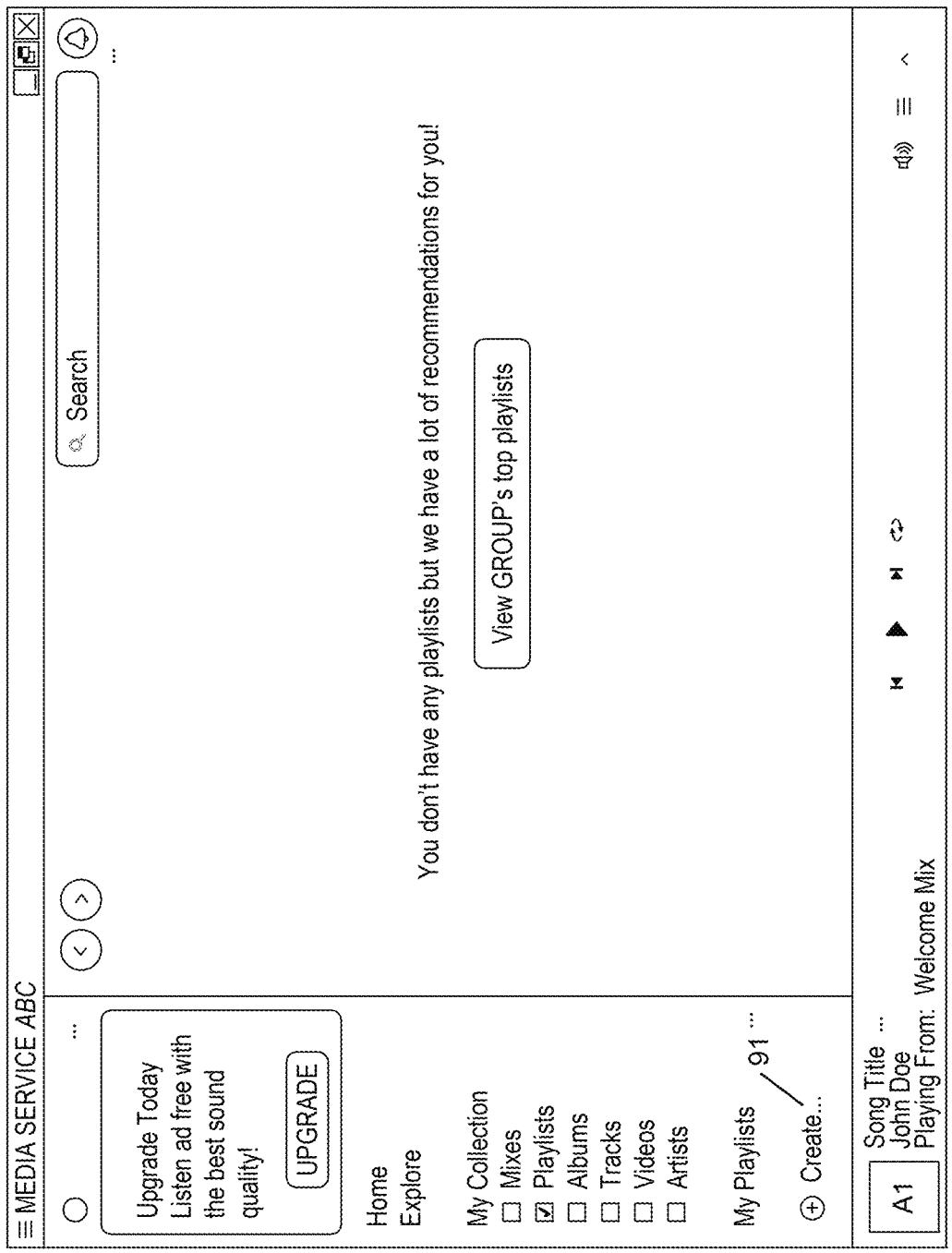
FIG. 9 shows an example of a user interface screen that can be used by the merchant to create a new playlist, according to an implementation of the present subject matter.

FIG. 9 shows an example of a GUI screen that can be used by the merchant, through the merchant interface 31, to create a new playlist when the merchant has not yet defined a playlist. In at least some embodiments, access to this screen and its functionality is provided by the merchant interface's implementing an API of the streaming media service, i.e., of the CP 8. To create a playlist, the user can click the "Create" control 91, which takes the user to another screen from which the user can select songs from among those of various suggested artists and albums, or search for additional artists, albums and/or songs. From the user's perspective, the playlist can be created in any known or convenient manner as done today on any existing streaming media service. For example, the merchant can input a name for a new playlist and then browse various artists, albums and or songs provided by the service, sampling those that are of interest, and select each song to be added by selecting a provided GUI control (e.g., by clicking an "Add to playlist" control). The specific sequence of actions by which a playlist is created can vary from one embodiment to another and is not germane to the technique introduced here. When the merchant is satisfied with the playlist, the merchant can click a GUI control to save the playlist, which is then automatically made available by the MMS to any customer of the merchant when the customer triggers a predetermined signal (e.g., activating a QR code or hyperlink).

Figure 10:
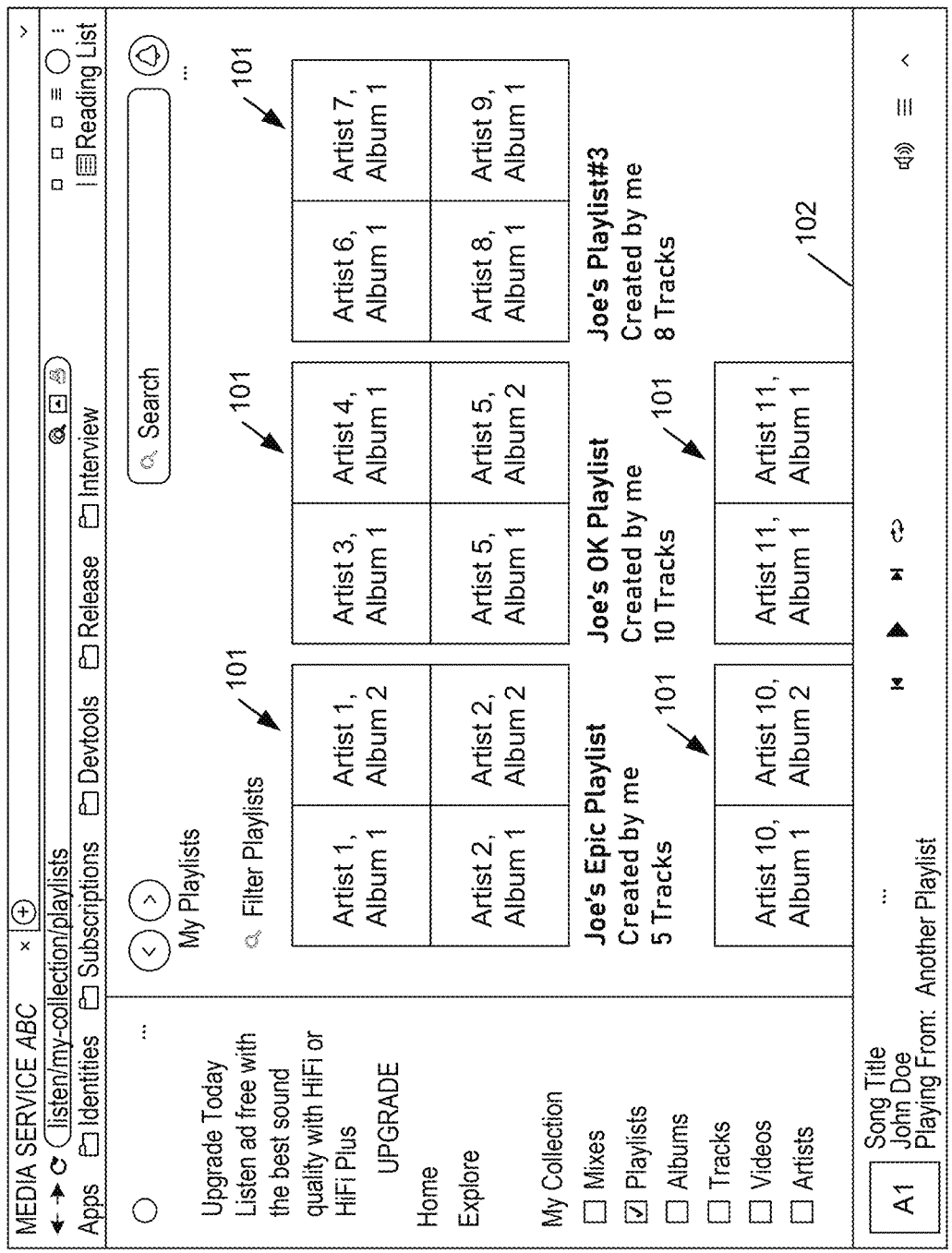
FIG. 10 shows an example of a merchant's playlist page, according to an implementation of the present subject matter.

FIG. 10 shows an example of a merchant's playlist page after several different playlists 101 have already been created and/or selected by the merchant. The merchant's playlist page can have the same general format as that of any other subscriber of the streaming media service; however, the playlist page's format and the content of any playlist may be customized by the merchant to suit his or her preferences. As shown, the example playlist page includes a number of different playlists 101 that have already been defined, each of which includes multiple artists and songs (e.g., as identified by names and logos). The merchant can play a song associated with any playlist at any time by using the player's control interface 102.

Once the merchant has defined a playlist, the merchant can then select a price per song (if any) to charge customers.

Figure 11:
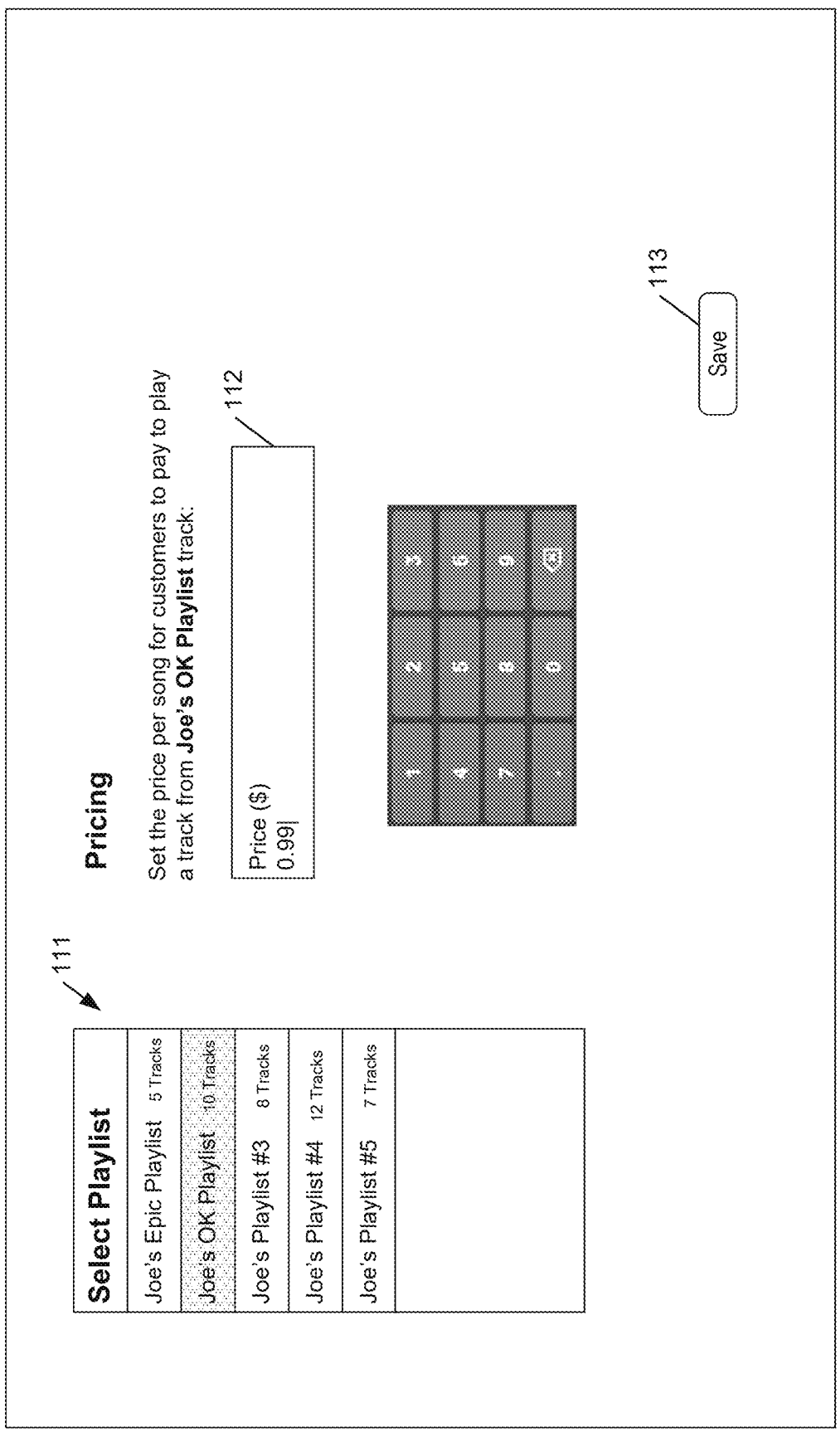
FIG. 11 shows an example of user interface screen that can be used by the merchant to set a price per song on the merchant's playlist, according to an implementation of the present subject matter.

FIG. 11 shows an example of a screen displayed by the merchant interface, that can be used to set a price per song. The user selects the desired playlist from the Select Playlist menu 111, specifies the price per song in the input field 112, and then clicks the Save button 113. In other embodiments, the merchant may be enabled to set a price individually for each song (or other media item). In yet other embodiments, the pricing may be variable depending on the identity of the customer accessing the song, or even free if a customer meets a predefined goal set by the merchant, e.g., a shopping limit, or applicable loyalty status or coupon.

Figure 12:
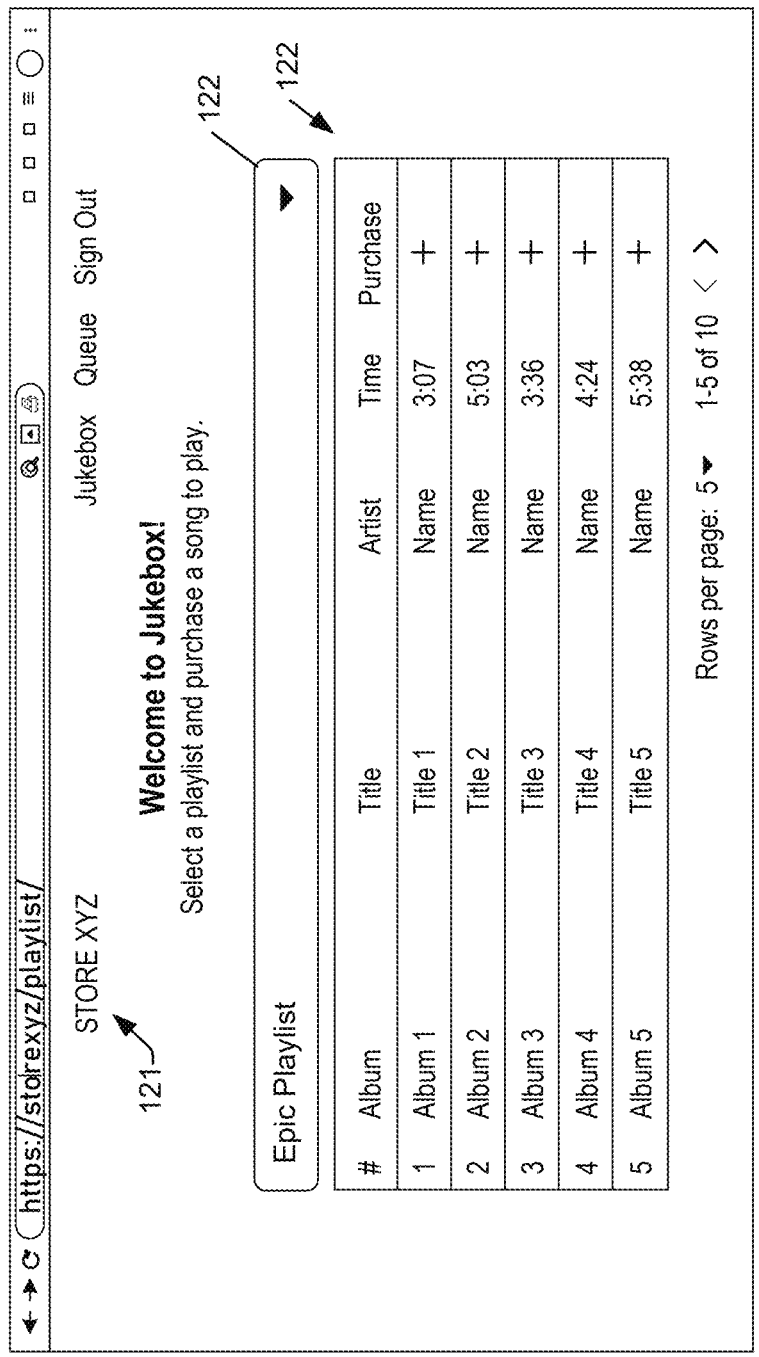
FIG. 12 illustrates an example of a screen from which a customer can select for playback a media item on a merchant's playlist, according to an implementation of the present subject matter.

FIG. 12 illustrates an example of a screen that may be displayed to a customer of the merchant, to enable the customer to select a merchant playlist and subsequently select a media item (e.g., song) in that playlist, for playback. The screen data is generated by the customer interface 32 of the MMS 4, but is displayed on a device of the customer, such as a smart phone, tablet, or personal computer. Transmission of the screen data from the customer interface to the device of the customer may be via a network or internetwork, such as a Wi-Fi network, Bluetooth, the Internet, cellular telecommunications network, or any combination thereof.

Although each playlist is defined within the streaming media service of the CP (via the merchant interface 31), the screen that the customer sees can be branded with the name, logo and/or other indicia 121 of the merchant. The screen may include a pulldown menu 122 that the customer can use to select from among multiple playlists previously defined by the merchant. Another portion of the screen includes a list of 123 of the media items included in the currently selected playlist. The customer can then select any one or more items (e.g., songs) on the currently selected playlist, to purchase for playback, by clicking the "+" symbol in the row that contains the desired media item. In response to doing so, the customer may be taken to a payment screen, by which to pay for playback of the selected media item.

FIG. 13 shows an example of a payment screen that can be used by the customer to purchase playback of a media item on the merchant's playlist. As with the screen of FIG. 12, the screen data for the screen in FIG. 13 can be generated by the MMS (e.g., by the customer interface 32) but is displayed by the customer's device. The screen can include identification 131 of the artist, album and title selected by the user for playback, and fields 132 in which the user can enter their credit card information. After the customer has entered his or her payment information, the customer clicks the Submit Payment button 133, which triggers the MMS to initiate a credit based payment transaction. When the MMS receives confirmation that the transaction has been approved, the MMS causes the selected media item to be added to the playback queue.

Figure 14A:
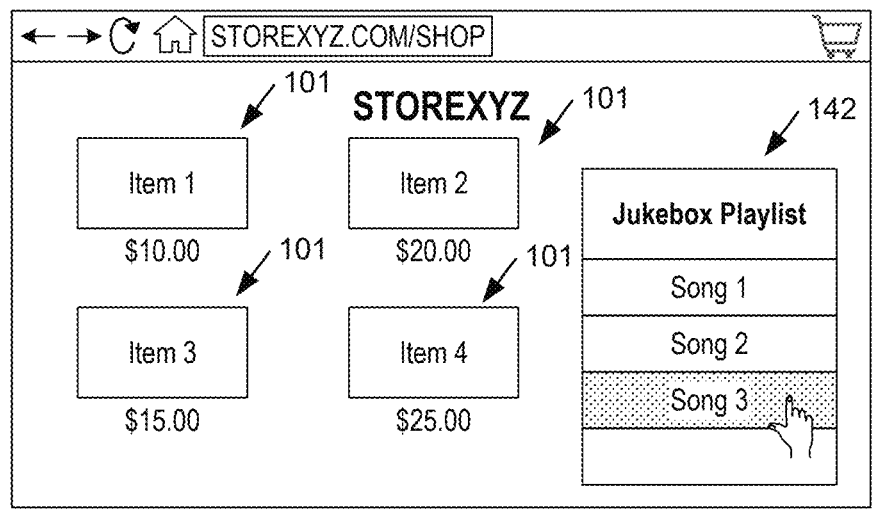
FIG. 14A shows an example of a screen, from an online shopping application of a merchant, including a merchant's playlist and products offered by the merchant, according to an implementation of the present subject matter.
Figure 14B:
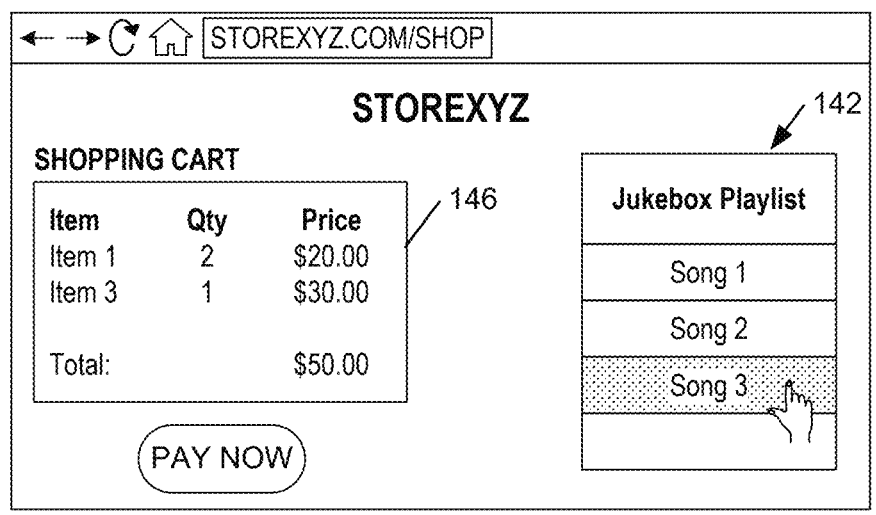
FIG. 14B shows an example of a screen, from the online shopping application of the merchant, including the merchant's playlist and the customer's shopping cart, according to an implementation of the present subject matter.

FIGS. 14A and 14B illustrate examples of display screens a customer may see when shopping on a merchant's online store equipped with the media capability described above. FIG. 14A shows an example of a screen from which the customer can browse various products 141 offered by the merchant (STORE XYZ in this example). While browsing products, the customer can see the merchant's predefined playlist 142 (which may be presented as a virtual jukebox) and select a song on the playlist for playback. The merchant may have previously elected whether or not to charge customers for playback of songs while browsing the site. The playlist may be displayed by a jukebox widget that has been added to the merchant's online shopping application. When the customer selects a song for playback, that song may be highlighted on the playlist, as shown. Further, when the customer selects a song, the site may take the customer to a payment screen immediately, if the merchant has configured the system to charge customer's for playing media, or payment can be deferred until later time, such as when the user chooses to check out.

The playlist showing the currently selected song is persisted on the display, and any song that has begun playback continues to play on interrupted as the customer navigates from one screen to another on the merchant's site. Hence, as shown in FIG. 14B, when the customer selects to view their shopping cart 146, the playlist 142 remains displayed and accessible, with the currently playing song highlighted. The user may be enabled to change the song that is being played by simply clicking on the song in the playlist.

Note that while the above description focuses mainly on use cases where the merchant selects songs that can be offered to the customer to play (e.g., by creating a playlist), in alternative embodiments the customer is enabled to access all of the CP's library to select songs to play, through the merchant's platform (e.g., MMS 4 or e-commerce application 24). In such embodiments, the customer may still be charged, through the merchant's platform, for playing the song while visiting the merchant's brick-and-mortar or online site.

Figure 15:
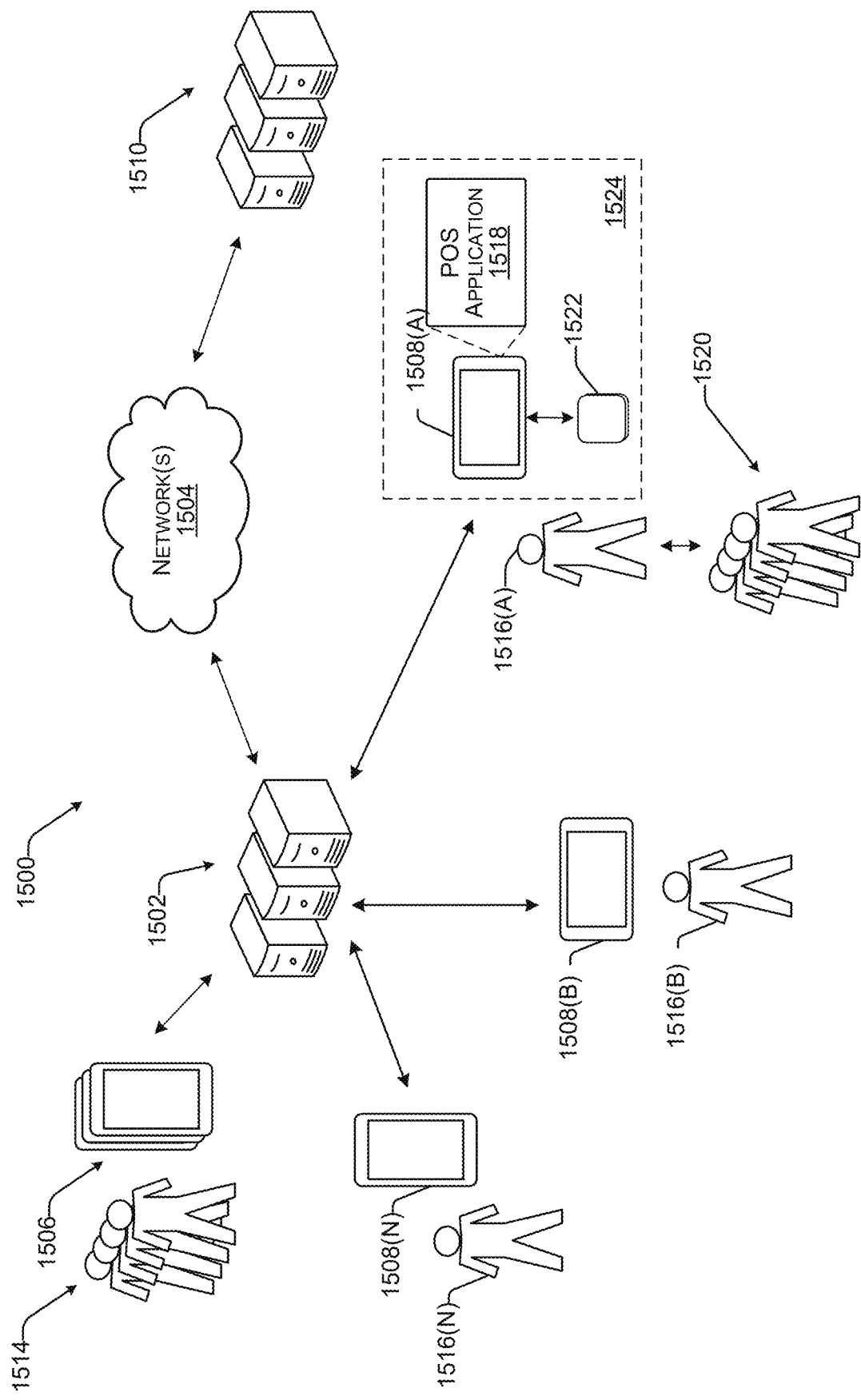
FIG. 15 shows an example environment in which a merchant point-of-sale (POS) application can be used, according to an implementation of the present subject matter.

FIG. 15 illustrates an example environment 1500. The environment 1500 includes server(s) 1502 that can communicate over a network 1504 with user devices 1506 (which, in some examples can be merchant devices 1508 (individually, 1508(A)-1508(N))) and/or server(s) 1510 associated with third-party service provider(s). The server(s) 1502 can be associated with a service provider that can provide one or more services for the benefit of users 1514, as described below. Actions attributed to the service provider can be performed by the server(s) 1502.

The environment 1500 can include a plurality of user devices 1506, as described above. Each one of the plurality of user devices 1506 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1514. The users 1514 can be referred to as customers, buyers, merchants, sellers, borrowers, employees, employers, payors, payees, couriers and so on. The users 1514 can interact with the user devices 1506 via user interfaces presented via the user devices 1506. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1506 can have an instance or versioned instance of an application, which can be downloaded from an application store, for example, which can present the user interface(s) described herein. In at least one example, a user 1514 can interact with the user interface via touch input, spoken input, or any other type of input.

As described above, in at least one example, the users 1514 can include merchants 1516 (individually, 1516(A)-1516(N)). In an example, the merchants 1516 can operate respective merchant devices 1508, which can be user devices 1506 configured for use by merchants 1516. For the purpose of this discussion, a "merchant" can be any entity that offers items (e.g., goods or services) for purchase or other means of acquisition (e.g., rent, borrow, barter, etc.). The merchants 1516 can offer items for purchase or other means of acquisition via brick-and-mortar stores, mobile stores (e.g., pop-up shops, food trucks, etc.), online stores, combinations of the foregoing, and so forth. In some examples, at least some of the merchants 1516 can be associated with a same entity but can have different merchant locations and/or can have franchise/franchisee relationships. In additional or alternative examples, the merchants 1516 can be different merchants. That is, in at least one example, the merchant 1516(A) is a different merchant than the merchant 1516(B) and/or the merchant 1516(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN) s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 1508 can have an instance of a POS application 1518 stored thereon. The POS application 1518 can configure the merchant device 1508 as a POS terminal, which enables the merchant 1516(A) to interact with one or more customers 1520. The POS application 1518 can be used to implement the merchant POS system 5 in FIG. 1, and therefore may be part of a merchant MMS, such as MMS 4 in FIG. 1. As described above, the users 1514 can include customers, such as the customers 1520 shown as interacting with the merchant 1516(A). For the purpose of this discussion, a "customer" can be any entity that acquires items from merchants. While only two customers 1520 are illustrated in FIG. 15, any number of customers 1520 can interact with the merchants 1516. Further, while FIG. 15 illustrates the customers 1520 interacting with the merchant 1516(A), the customers 1520 can interact with any of the merchants 1516.

In at least one example, interactions between the customers 1520 and the merchants 1516 that involve the exchange of funds (from the customers 1520) for items (from the merchants 1516) can be referred to as "transactions." In at least one example, the POS application 1518 can determine transaction data associated with the POS transactions. Transaction data can include payment information, which can be obtained from a reader device 1522 associated with the merchant device 1508(A), user authentication data, purchase amount information, point-of-purchase information (e.g., item(s) purchased, date of purchase, time of purchase, etc.), etc. The POS application 1518 can send transaction data to the server(s) 1502 such that the server(s) 1502 can track transactions of the customers 1520, merchants 1516, and/or any of the users 1514 over time. Furthermore, the POS application 1518 can present a UI to enable the merchant 1516(A) to interact with the POS application 1518 and/or the service provider via the POS application 1518.

In at least one example, the merchant device 1508(A) can be a special-purpose computing device configured as a POS terminal (via the execution of the POS application 1518). In at least one example, the POS terminal may be connected to a reader device 1522, which is capable of accepting a variety of payment instruments, such as credit cards, debit cards, gift cards, short-range communication based payment instruments, and the like, as described below. In at least one example, the reader device 1522 can plug in to a port in the merchant device 1508(A), such as a microphone port, a headphone port, an audio-jack, a data port, or other suitable port. In additional or alternative examples, the reader device 1522 can be coupled to the merchant device 1508(A) via another wired or wireless connection, such as via a Bluetooth®, BLE, and so on. Additional details are described below with reference to FIG. 7. In some examples, the reader device 1522 can read information from alternative payment instruments including, but not limited to, wristbands and the like.

In some examples, the reader device 1522 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 1522, and communicate with the server(s) 1502, which can provide, among other services, a payment processing service. The server(s) 1502 associated with the service provider can communicate with server(s) 1510, as described below. In this manner, the POS terminal and reader device 1522 may collectively process transaction(s) between the merchants 1516 and customers 1520. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 1522 of the POS system 1524 are shown as separate devices, in additional or alternative examples, the POS terminal and the reader device 1522 can be part of a single device. In some examples, the reader device 1522 can have a display integrated therein for presenting information to the customers 1520. In additional or alternative examples, the POS terminal can have a display integrated therein for presenting information to the customers 1520. POS systems, such as the POS system 1524, may be mobile, such that POS terminals and reader devices may process transactions in disparate locations across the world. POS systems can be used for processing card-present transactions and card-not-present (CNP) transactions, as described below.

A card-present transaction is a transaction where both a customer 1520 and his or her payment instrument are physically present at the time of the transaction. Card-present transactions may be processed by swipes, dips, taps, or any other interaction between a physical payment instrument (e.g., a card), or otherwise present payment instrument, and a reader device 1522 whereby the reader device 1522 is able to obtain payment data from the payment instrument. A swipe is a card-present transaction where a customer 1520 slides a card, or other payment instrument, having a magnetic strip through a reader device 1522 that captures payment data contained in the magnetic strip. A dip is a card-present transaction where a customer 1520 inserts a payment instrument having an embedded microchip (i.e., chip) into a reader device 1522 first. The dipped payment instrument remains in the payment reader until the reader device 1522 prompts the customer 1520 to remove the card, or other payment instrument. While the payment instrument is in the reader device 1522, the microchip can create a one-time code which is sent from the POS system 1524 to the server(s) 1510 (which can be associated with third-party service providers that provide payment services, including but not limited to, an acquirer bank, an issuer, and/or a card payment network (e.g., Mastercard®, VISAR, etc.)) to be matched with an identical one-time code. A tap is a card-present transaction where a customer 1520 may tap or hover his or her payment instrument (e.g., card, electronic device such as a smart phone running a payment application, etc.) over a reader device 1522 to complete a transaction via short-range communication (e.g., NFC, RFID, Bluetooth®, BLE, etc.). Short-range communication enables the payment instrument to exchange information with the reader device 1522. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 1524, the server(s) 1502, and/or the server(s) 1510 may exchange payment information and transaction data to determine whether transactions are authorized. For example, the POS system 1524 may provide encrypted payment data, user authentication data, purchase amount information, point-of-purchase information, etc. (collectively, transaction data) to server(s) 1502 over the network(s) 1504. The server(s) 1502 may send the transaction data to the server(s) 1510. As described above, in at least one example, the server(s) 1510 can be associated with third-party service providers that provide payment services, including but not limited to, an acquirer bank, an issuer, and/or a card payment network (e.g., Mastercard®, VISAR, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server(s) 1510 associated therewith) can send a fund transfer request to a server computing device of a card payment network (e.g., Mastercard®, VISAR, etc.) to determine whether the transaction is authorized or deficient. In at least one example, the service provider can serve as an acquirer and connect directly with the card payment network.

The card payment network (e.g., the server(s) 1510 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server(s) 1510 associated therewith) can make a determination as to whether the customer has the capacity to absorb the relevant charge associated with the payment transaction. In at least one example, the service provider can serve as an issuer and/or can partner with an issuer. The transaction is either approved or rejected by the issuer and/or the card payment network (e.g., the server(s) 1510 associated therewith), and a payment authorization message is communicated from the issuer to the POS device via a path opposite of that described above, or via an alternate path.

As described above, the server(s) 1510, which can be associated with payment service provider(s), may determine whether the transaction is authorized based on the transaction data, as well as information relating to parties to the transaction (e.g., the customer 1520 and/or the merchant 1516(A)). The server(s) 1510 may send an authorization notification over the network(s) 1504 to the server(s) 1502, which may send the authorization notification to the POS system 1524 over the network(s) 1504 to indicate whether the transaction is authorized. The server(s) 1502 may also transmit additional information such as transaction identifiers to the POS system 1524. In one example, the server(s) 1502 may include a merchant application and/or other functional components for communicating with the POS system 1524 and/or the server(s) 1510 to authorize or decline transactions.

Based on the authentication notification that is received by the POS system 1524 from server(s) 1502, the merchant 1516(A) may indicate to the customer 1520 whether the transaction has been approved. In some examples, approval may be indicated at the POS system 1524, for example, at a display of the POS system 1524. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, and so on. In some examples, the users 1514 can access all of the services of the service provider. In other examples, the users 1514 can have gradated access to the services, which can be based on risk tolerance, IDV outputs, subscriptions, and so on. In at least one example, access to such services can be availed to the merchants 1516 via the POS application 1518. In additional or alternative examples, each service can be associated with its own access point (e.g., application, web browser, etc.).

The service provider can offer payment processing services for processing payments on behalf of the merchants 1516, as described above. For example, the service provider can provision payment processing software, payment processing hardware and/or payment processing services to merchants 1516, as described above, to enable the merchants 1516 to receive payments from the customers 1520 when conducting POS transactions with the customers 1520. For instance, the service provider can enable the merchants 1516 to receive cash payments, payment card payments, and/or electronic payments from customers 1520 for POS transactions and the service provider can process transactions on behalf of the merchants 1516.

As the service provider processes transactions on behalf of the merchants 1516, the service provider can maintain accounts or balances for the merchants 1516 in one or more ledgers. For example, the service provider can analyze transaction data received for a transaction to determine an amount of funds owed to a merchant 1516(A) for the transaction. In at least one example, such an amount can be a total purchase price less fees charged by the service provider for providing the payment processing services. Based on determining the amount of funds owed to the merchant 1516(A), the service provider can deposit funds into an account of the merchant 1516(A). The account can have a stored balance, which can be managed by the service provider. The account can be different from a conventional bank account at least because the stored balance is managed by a ledger of the service provider and the associated funds are accessible via various withdrawal channels including, but not limited to, scheduled deposit, same-day deposit, instant deposit, and a linked payment instrument.

A scheduled deposit can occur when the service provider transfers funds associated with a stored balance of the merchant 1516(A) to a bank account of the merchant 1516(A) that is held at a bank or other financial institution (e.g., associated with the server(s) 1510). Scheduled deposits can occur at a prearranged time after a POS transaction is funded, which can be a business day after the POS transaction occurred, or sooner or later. In some examples, the merchant 1516(A) can access funds prior to a scheduled deposit. For instance, the merchant 1516(A) may have access to same-day deposits (e.g., wherein the service provider deposits funds from the stored balance to a linked bank account of the merchant on a same day as POS transaction, in some examples prior to the POS transaction being funded) or instant deposits (e.g., wherein the service provider deposits funds from the stored balance to a linked bank account of the merchant on demand, such as responsive to a request). Further, in at least one example, the merchant 1516(A) can have a payment instrument that is linked to the stored balance that enables the merchant to access the funds without first transferring the funds from the account managed by the service provider to the bank account of the merchant 1516(A).

In at least one example, the service provider may provide inventory management services. That is, the service provider may provide inventory tracking and reporting. Inventory management services may enable the merchant 1516(A) to access and manage a database storing data associated with a quantity of each item that the merchant 1516(A) has available (i.e., an inventory). Furthermore, in at least one example, the service provider can provide catalog management services to enable the merchant 1516(A) to maintain a catalog, which can be a database storing data associated with items that the merchant 1516(A) has available for acquisition (i.e., catalog management services). In at least one example, the catalog may include a plurality of data items and a data item of the plurality of data items may represent an item that the merchant 1516(A) has available for acquisition. The service provider can offer recommendations related to pricing of the items, placement of items on the catalog, and multi-party fulfillment of the inventory.

In at least one example, the service provider can provide business banking services, which allow the merchant 1516(A) to track deposits (from payment processing and/or other sources of funds) into an account of the merchant 1516(A), payroll payments from the account (e.g., payments to employees of the merchant 1516(A)), payments to other merchants (e.g., business-to-business) directly from the account or from a linked debit card, withdrawals made via scheduled deposit and/or instant deposit, etc. Furthermore, the business banking services can enable the merchant 1516(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 1516 to visualize their cash flow to track their financial health, set aside money for upcoming obligations (e.g., savings), organize money around goals, etc.

In at least one example, the service provider can provide financing services and products, such as via business loans, consumer loans, fixed term loans, flexible term loans, and the like. In at least one example, the service provider can utilize one or more risk signals to determine whether to extend financing offers and/or terms associated with such financing offers.

In at least one example, the service provider can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider can offer different types of capital loan products. For instance, in at least one example, the service provider can offer a daily repayment loan product, wherein a capital loan is repaid daily, for instance, from a portion of transactions processed by the payment processing service on behalf of the borrower. Additionally and/or alternatively, the service provider can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 1516. The service provider can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider (e.g., from payments owed to the merchant from payments processed on behalf of the merchant, funds transferred to the merchant, etc.). The service provider can offer specific financial products, such as payment instruments, tied specifically to the loan products. For example, in one implementation, the server provider 1512 associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider can provide web-development services, which enable users 1514 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 1516. In at least one example, the service provider can recommend and/or generate content items to supplement omni-channel presences of the merchants 1516. That is, if a merchant of the merchants 1516 has a web page, the service provider—via the web-development or other services—can recommend and/or generate additional content items to be presented via other channel(s), such as social media, email, etc.

Furthermore, the service provider can provide payroll services to enable employers to pay employees for work performed on behalf of employers. In at least one example, the service provider can receive data that includes time worked by an employee (e.g., through imported timecards and/or POS interactions), sales made by the employee, gratuities received by the employee, and so forth. Based on such data, the service provider can make payroll payments to employee(s) on behalf of an employer via the payroll service. For instance, the service provider can facilitate the transfer of a total amount to be paid out for the payroll of an employee from the bank of the employer to the bank of the service provider to be used to make payroll payments. In at least one example, when the funds have been received at the bank of the service provider, the service provider can pay the employee, such as by check or direct deposit, often a day, a week, or more after when the work was actually performed by the employee. In additional or alternative examples, the service provider can enable employee(s) to receive payments via same-day or instant deposit based at least in part on risk and/or reliability analyses performed by the service provider.

Moreover, in at least one example, the service provider can provide employee management services for managing schedules of employees. Further, the service provider can provide appointment services for enabling users 1514 to set schedules for scheduling appointments and/or users 1514 to schedule appointments.

In some examples, the service provider can provide restaurant management services to enable users 1514 to make and/or manage reservations, to monitor front-of-house and/or back-of-house operations, and so on. In such examples, the merchant device(s) 1508 and/or server(s) 1502 can be configured to communicate with one or more other computing devices, which can be located in the front-of-house (e.g., POS device(s)) and/or back-of-house (e.g., kitchen display system(s) (KDS)). In at least one example, the service provider can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider can provide fulfilment services, which can use couriers for delivery, wherein couriers can travel between multiple locations to provide delivery services, photography services, etc. Couriers can be users 1514 who can travel between locations to perform services for a requesting user 1514 (e.g., deliver items, capture images, etc.). In some examples, the courier can receive compensation from the service provider. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider can receive requests for courier services, automatically assign the requests to active couriers, and communicate dispatch instructions to couriers via user interface (e.g., application, web browser, or other access point) presented via respective devices 1506.

In some examples, the service provider can provide omni-channel fulfillment services. For instance, if a customer places an order with a merchant and the merchant cannot fulfill the order because one or more items are out of stock or otherwise unavailable, the service provider can leverage other merchants and/or sales channels that are part of the platform of the service provider to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider can enable conversational commerce via conversational commerce services, which can use one or more machine learning mechanisms to analyze messages exchanged between two or more users 1514, voice inputs into a virtual assistant or the like, to determine intents of user(s) 1514. In some examples, the service provider can utilize determined intents to automate customer service, offer promotions, provide recommendations, or otherwise interact with customers in real-time. In at least one example, the service provider can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 1514 may be new to the service provider such that the user 1514 that has not registered (e.g., subscribed to receive access to one or more services offered by the service provider) with the service provider. The service provider can offer onboarding services for registering a potential user 1514 with the service provider. In some examples, onboarding can involve presenting various questions, prompts, and the like to a potential user 1514 to obtain information that can be used to generate a profile for the potential user 1514. In at least one example, the service provider can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 1514 providing all necessary information, the potential user 1514 can be onboarded to the service provider. In such an example, any limited or short-term access to services of the service provider can be transitioned to more permissive (e.g., less limited) or longer-term access to such services.

The service provider can be associated with IDV services, which can be used by the service provider for compliance purposes and/or can be offered as a service, for instance to third-party service providers (e.g., associated with the server(s) 1510). That is, the service provider can offer IDV services to verify the identity of users 1514 seeking to use or using their services. Identity verification requires a customer (or potential customer) to provide information that is used by compliance departments to prove that the information is associated with an identity of a real person or entity. In at least one example, the service provider can perform services for determining whether identifying information provided by a user 1514 accurately identifies the customer (or potential customer) (i.e., Is the customer who they say they are?).

The service provider is capable of providing additional or alternative services and the services described above are offered as a sampling of services. In at least one example, the service provider can exchange data with the server(s) 1510 associated with third-party service providers. Such third-party service providers can provide information that enables the service provider to provide services, such as those described above. In additional or alternative examples, such third-party service providers can access services of the service provider. That is, in some examples, the third-party service providers can be subscribers, or otherwise access, services of the service provider.

Techniques described herein can be configured to operate in both real-time/online and offline modes. "Online" modes refer to modes when devices are capable of communicating with the service provider (e.g., the server(s) 1502) and/or the server(s) 1510 via the network(s) 1504. In some examples, the merchant device(s) 1508 are not capable of connecting with the service provider (e.g., the server(s) 1502) and/or the server(s) 1510, due to a network connectivity issue, for example. In additional or alternative examples, the server(s) 1502 are not capable of communicating with the server(s) 1510 due to network connectivity issue, for example. In such examples, devices may operate in "offline" mode where at least some payment data is stored (e.g., on the merchant device(s) 1508) and/or the server(s) 1502 until connectivity is restored and the payment data can be transmitted to the server(s) 1502 and/or the server(s) 1510 for processing.

In at least one example, the service provider can be associated with a hub, such as an order hub, an inventory hub, a fulfillment hub and so on, which can enable integration with one or more additional service providers (e.g., associated with the additional server(s) 1510). In some examples, such additional service providers can offer additional or alternative services and the service provider can provide an interface or other computer-readable instructions to integrate functionality of the service provider into the one or more additional service providers.

Techniques described herein are directed to services provided via a distributed system of user devices 1506 that are in communication with server(s) 1502 of the service provider. That is, techniques described herein are directed to a specific implementation—or, a practical application—of utilizing a distributed system of user devices 1506 that are in communication with server(s) 1502 of the service provider to perform a variety of services, as described above. The unconventional configuration of the distributed system described herein enables the server(s) 1502 that are remotely-located from end-users (e.g., users 1514) to intelligently offer services based on aggregated data associated with the end-users, such as the users 1514 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider, and those outside of the control of the service provider, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1514 and user devices 1506. Furthermore, such features are changed dynamically based on the profiles of the users involved interacting with the GUIs. As such, techniques described herein are directed to improvements to computing systems.

Figure 16:
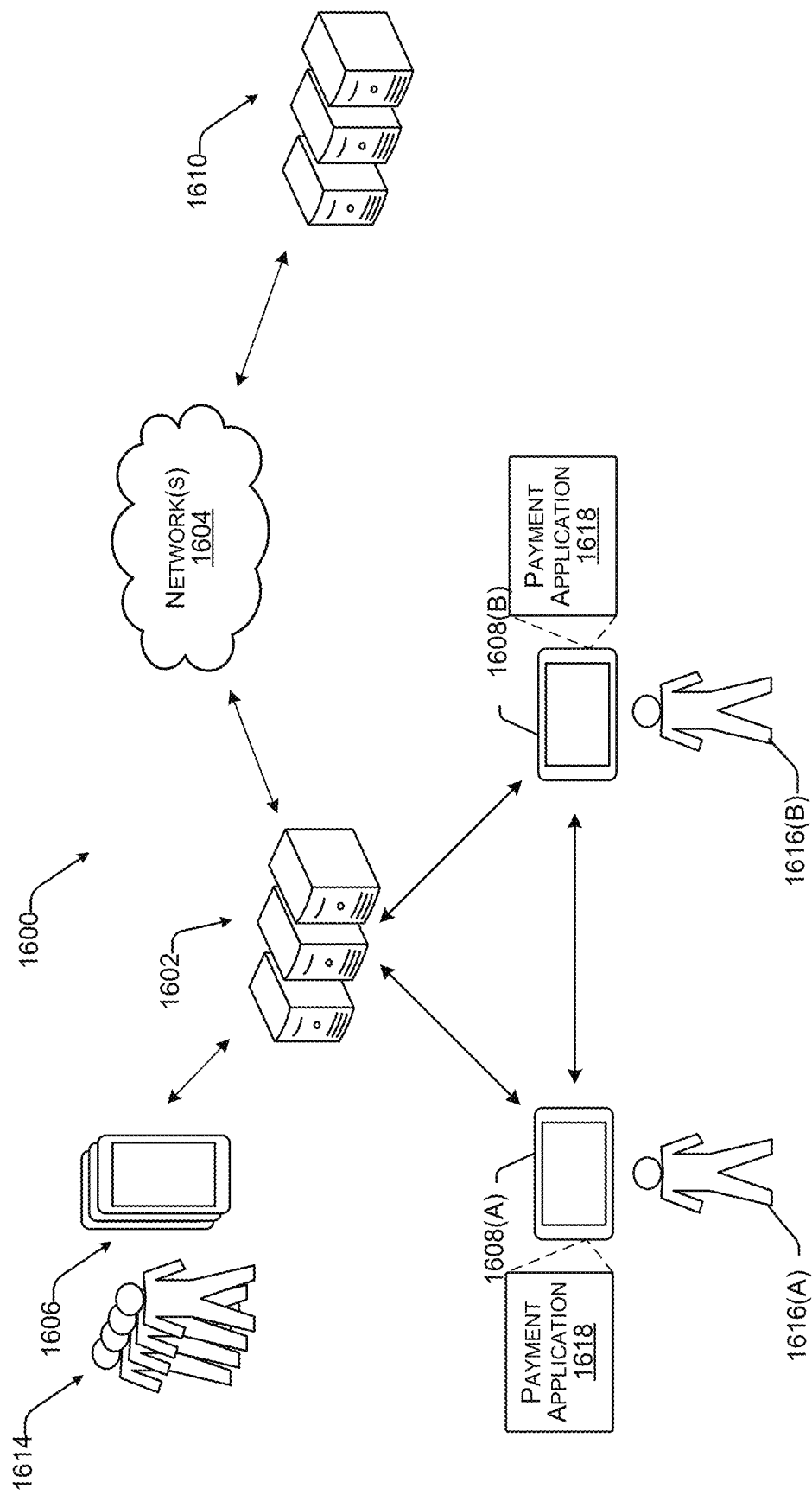
FIG. 16 shows an example environment in which a payment application for direct transfer of cash between users can be used, according to an implementation of the present subject matter.

FIG. 16 illustrates another example environment 1600. The environment 1600 includes server(s) 1602 that can communicate over a network 1604 with user devices 1606 (which, in some examples can be user devices 1608 (individually, 1608(A), 1608(B)) and/or server(s) 1610 associated with third-party service provider(s). The server(s) 1602 can be associated with a service provider that can provide one or more services for the benefit of users 1614, as described below. Actions attributed to the service provider can be performed by the server(s) 1602. In some examples, the service provider referenced in FIG. 15 can be the same or different than the service provider referenced in FIG. 16.

The environment 1600 can include a plurality of user devices 1606, as described above. Each one of the plurality of user devices 1606 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1614. The users 1614 can be referred to as customers, buyers, merchants, sellers, borrowers, employees, employers, payors, payees, couriers and so on. The users 1614 can interact with the user devices 1606 via user interfaces presented via the user devices 1606. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1606 can have an instance or versioned instance of an application, which can be downloaded from an application store, for example, which can present the user interface(s) described herein. In at least one example, a user 1614 can interact with the user interface via touch input, spoken input, or any other type of input.

In at least one example, the service provider can provide a peer-to-peer payment service that enables peer-to-peer payments between two or more users 1614. Two users, user 1616(A) and user 1616(B) are illustrated in FIG. 16 as "peers" in a peer-to-peer payment. In at least one example, the service provider can communicate with instances of a payment application 1618 (or other access point) installed on devices 1606 configured for operation by users 1614. In an example, an instance of the payment application 1618 executing on a first device 1608(A) operated by a payor (e.g., user 1616(A)) can send a request to the service provider to transfer an asset (e.g., fiat currency, non-fiat currency, digital assets, cryptocurrency, securities, gift cards, and/or related assets) from the payor to a payee (e.g., user 1616(B)) via a peer-to-peer payment. In some examples, assets associated with an account of the payor are transferred to an account of the payee. In some examples, assets can be held at least temporarily in an account of the service provider prior to transferring the assets to the account of the payee.

Figure 17:
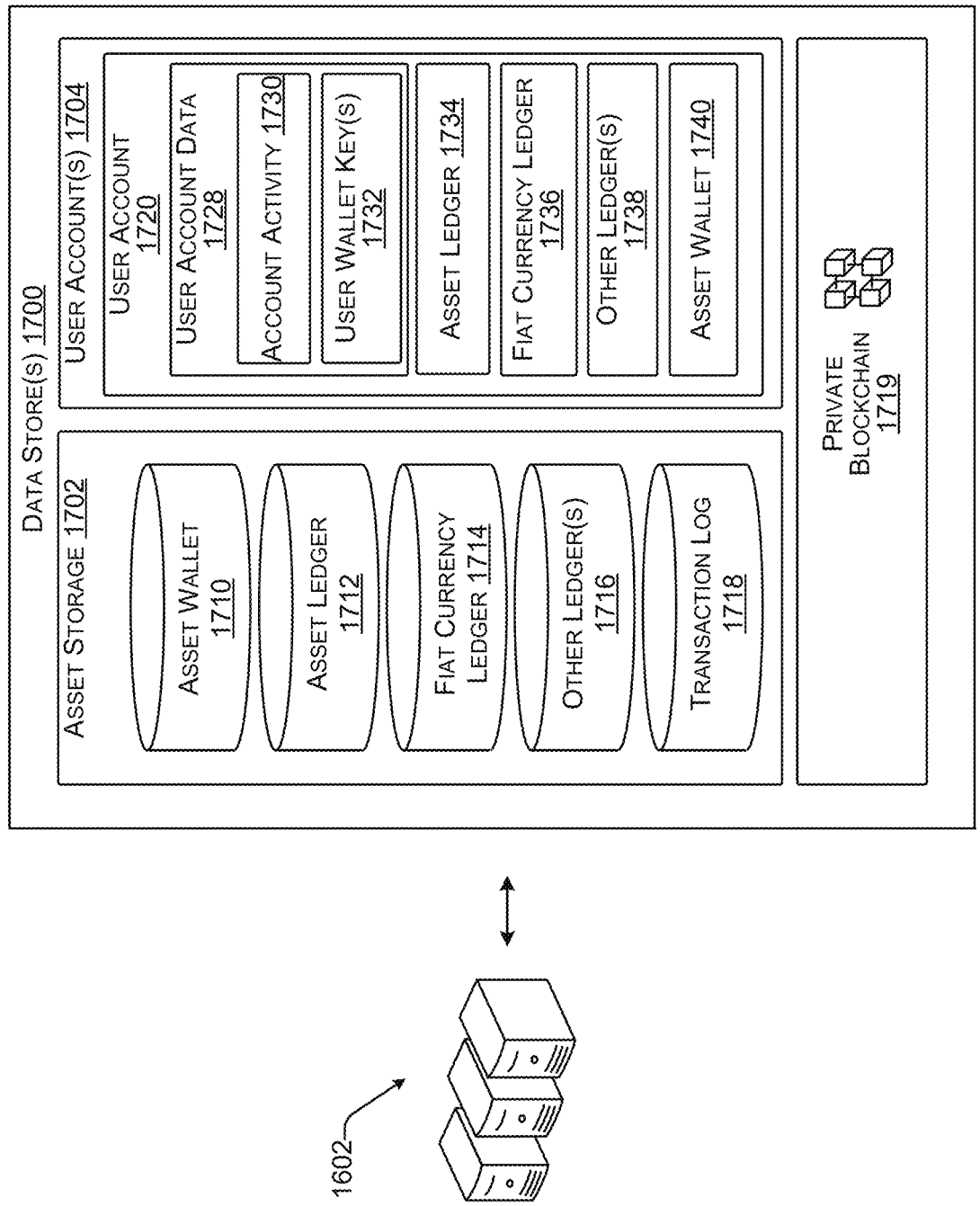
FIG. 17 illustrates an example of one or more data stores that can be associated with one or more servers, to enable blockchain based tracking of assets, according to an implementation of the present subject matter.

In some examples, the service provider can utilize a ledger system to track transfers of assets between users 1614. FIG. 17, below, provides additional details associated with such a ledger system. The ledger system can enable users 1614 to own fractional shares of assets that are not conventionally available. For instance, a user can own a fraction of a Bitcoin or a stock. Additional details are described herein.

In at least one example, the service provider can facilitate transfers and can send notifications related thereto to instances of the payment application 1618 executing on user device(s) of payee(s). As an example, the service provider can transfer assets from an account of user 1616(A) to an account of the user 1616(B) and can send a notification to the user device 1608(B) of the user 1616(B) for presentation via a user interface. The notification can indicate that a transfer is in process, a transfer is complete, or the like. In some examples, the service provider can send additional or alternative information to the instances of the payment application 1618 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the service provider funds the request to payee on behalf of the payor, to speed up the transfer process and compensate for any lags that may be attributed to the payor's financial network.

In some examples, the service provider can trigger the peer-to-peer payment process through identification of a "payment proxy" having a particular syntax. For example, the syntax can include a monetary currency indicator prefixing one or more alphanumeric characters (e.g., $Cash). The currency indicator operates as the tagging mechanism that indicates to the server(s) 1602 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. In some examples, additional or alternative identifiers can be used to trigger the peer-to-peer payment process. For instance, email, telephone number, social media handles, and/or the like can be used to trigger and/or identify users of a peer-to-peer payment process.

In some examples, the peer-to-peer payment process can be initiated through instances of the payment application 1618 executing on the user devices 1606. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider can generate the landing page to enable the recipient to conveniently receive one or more payments from one or more senders. In some examples, the personalized location address identifying the landing page can be a uniform resource locator (URL) that incorporates the payment proxy. In such examples, the landing page can be a web page, e.g., www.cash.me/$Cash.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. In some examples, the content provider can be the service provider as described with reference to FIG. 16 or a third-party service provider associated with the server(s) 1610. In examples where the content provider is a third-party service provider, the server(s) 1610 can be accessible via one or more APIs or other integrations. The forum can be employed by a content provider to enable users of the forum to interact with one another (e.g., through creating messages, posting comments, etc.). In some examples, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be employed by the service provider referenced in FIG. 16. For instance, the service provider can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1606 (e.g., mobile device or conventional personal computer (PC)) based on instructions transmitted to and from the server(s) 1602 (which, in such an example can be called a "messaging server"). In some instances, the messaging application can include a payment application with messaging capability that enables users of the payment application to communicate with one another. In such instances, the payment application can be executed on a user device 1606 based on instructions transmitted to and from the server(s) 1602 (e.g., the payment service discussed in this description or another payment service that supports payment transactions). In some examples, the messaging application can be provided by a third-party service provider associated with the server(s) 1610. In examples where the messaging application is a third-party service provider, the server(s) 1610 can be accessible via one or more APIs or other integrations.

As described above, the service provider can facilitate peer-to-peer transactions, which can enable users 1614 to transfer fiat currency, non-fiat currency, cryptocurrency, securities, or other assets, or portions thereof, to other users 1614. In at least one example, individual users can be associated with user accounts. Additional details associated with user accounts and the transfer of assets between users 1614 are described below with reference to FIG. 17.

Furthermore, the service provider of FIG. 16 can enable users 1614 to perform banking transactions via instances of the payment application 1618. For example, users can configure direct deposits or other deposits for adding assets to their various ledgers/balances. Further, users 1614 can configure bill pay, recurring payments, and/or the like using assets associated with their accounts. In addition to sending and/or receiving assets via peer-to-peer transactions, users 1614 buy and/or sell assets via asset networks such as cryptocurrency networks, securities networks, and/or the like.

FIG. 17 illustrates example data store(s) 1700 that can be associated with the server(s) 1602. In at least one example, the data store(s) 1700 can store assets in an asset storage 1702, as well as data in user account(s) 1704. In some examples, user account(s) 1704 can include merchant account(s) 1706, and/or customer account(s) 1708. In at least one example, the asset storage 1702 can be used to store assets managed by the service provider of FIG. 16. In at least one example, the asset storage 1702 can be used to record whether individual of the assets are registered to users. For example, the asset storage 1702 can include an asset wallet 1710 for storing records of assets owned by the service provider of FIG. 16, such as cryptocurrency, securities, or the like, and communicating with one or more asset networks, such as cryptocurrency networks, securities networks, or the like. In some examples, the asset network can be a first-party network or a third-party network, such as a cryptocurrency exchange or the stock market. In examples where the asset network is a third-party network, the server(s) 1610 can be associated therewith. In some examples, the asset wallet 1710 can communicate with the asset network via one or more components associated with the server(s) 1602.

The asset wallet 1710 can be associated with one or more addresses and can vary addresses used to acquire assets (e.g., from the asset network(s)) so that its holdings are represented under a variety of addresses on the asset network. In examples where the service provider of FIG. 16 has its own holdings of cryptocurrency (e.g., in the asset wallet 1710), a user can acquire cryptocurrency directly from the service provider of FIG. 16. In some examples, the service provider of FIG. 16 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In all of these scenarios, the buying and selling of cryptocurrency, and therefore the associated updating of the public ledger of asset network can be separate from any customer-merchant transaction or peer-to-peer transaction, and therefore not necessarily time-sensitive. This can enable batching transactions to reduce computational resources and/or costs. The service provider can provide the same or similar functionality for securities or other assets.

The asset storage 1702 may contain ledgers that store records of assignments of assets to users 1614. Specifically, the asset storage 1702 may include asset ledger 1710, fiat currency ledger 1714, and other ledger(s) 1716, which can be used to record transfers of assets between users 1614 of the service provider and/or one or more third-parties (e.g., merchant network(s), payment card network(s), ACH network(s), equities network(s), the asset network, securities networks, etc.). In doing so, the asset storage 1702 can maintain a running balance of assets managed by the service provider of FIG. 16. The ledger(s) of the asset storage 1702 can further indicate some of the running balance for each of the ledger(s) stored in the asset storage 1702 is assigned or registered to one or more user account(s) 1704.

In at least one example, the asset storage 1702 can include transaction logs 1718, which can include records of past transactions involving the service provider of FIG. 16. In at least one example, transaction data, as described herein, can be stored in association with the transaction logs 1718.

In some examples, the data store(s) 1700 can store a private blockchain 1719. A private blockchain 1719 can function to record sender addresses, recipient addresses, public keys, values of cryptocurrency transferred, and/or can be used to verify ownership of cryptocurrency tokens to be transferred. In some examples, the service provider of FIG. 16 can record transactions taking place within the service provider of FIG. 16 involving cryptocurrency until the number of transactions has exceeded a determined limit (e.g., number of transactions, storage space allocation, etc.). Based at least in part on determining that the limit has been reached, the service provider of FIG. 16 can publish the transactions in the private blockchain 1719 to a public blockchain (e.g., associated with the asset network), where miners can verify the transactions and record the transactions to blocks on the public blockchain. In at least one example, the service provider of FIG. 16 can participate as miner(s) at least for its transactions to be posted to the public blockchain.

In at least one example, the data store(s) 1700 can store and/or manage accounts, such as user account(s) 1704, merchant account(s) 1706, and/or customer account(s) 1708. In at least one example, the user account(s) 1704 may store records of user accounts associated with the users 1614. In at least one example, the user account(s) 1704 can include a user account 1720, which can be associated with a user (of the users 1614). Other user accounts of the user account(s) 1704 can be similarly structured to the user account 1720, according to some examples. In other examples, other user accounts may include more or less data and/or account information than that provided by the user account 1720. In at least one example, the user account 1720 can include user account data 1728, which can include, but is not limited to, data associated with user identifying information (e.g., name, phone number, address, etc.), user identifier(s) (e.g., alphanumeric identifiers, etc.), user preferences (e.g., learned or user-specified), purchase history data (e.g., identifying one or more items purchased (and respective item information), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1728 can include account activity 1730 and user wallet key(s) 1732. The account activity 1730 may include a transaction log for recording transactions associated with the user account 1720. In some examples, the user wallet key(s) 1732 can include a public-private key-pair and a respective address associated with the asset network or other asset networks. In some examples, the user wallet key(s) 1732 may include one or more key pairs, which can be unique to the asset network or other asset networks.

In addition to the user account data 1728, the user account 1720 can include ledger(s) for account(s) managed by the service provider of FIG. 16, for the user. For example, the user account 1720 may include an asset ledger 1734, a fiat currency ledger 1736, and/or one or more other ledgers 1738. The ledger(s) can indicate that a corresponding user utilizes the service provider of FIG. 16 to manage corresponding accounts (e.g., a cryptocurrency account, a securities account, a fiat currency account, etc.). It should be noted that in some examples, the ledger(s) can be logical ledger(s) and the data can be represented in a single database. In some examples, individual of the ledger(s), or portions thereof, can be maintained by the service provider of FIG. 16.

In some examples, the asset ledger 1734 can store a balance for each of one or more cryptocurrencies (e.g., Bitcoin, Ethereum, Litecoin, etc.) registered to the user account 1720. In at least one example, the asset ledger 1734 can further record transactions of cryptocurrency assets associated with the user account 1720. For example, the user account 1720 can receive cryptocurrency from the asset network using the user wallet key(s) 1732. In some examples, the user wallet key(s) 1732 may be generated for the user upon request. User wallet key(s) 1732 can be requested by the user in order to send, exchange, or otherwise control the balance of cryptocurrency held by the service provider of FIG. 16 (e.g., in the asset wallet 1710) and registered to the user. In some examples, the user wallet key(s) 1732 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider of FIG. 16 and the value is credited as a balance in asset ledger 1734), by purchasing currency in the form associated with the account using currency in a different form (e.g., buying a value of cryptocurrency from the service provider of FIG. 16 using a value of fiat currency reflected in fiat currency ledger 1736, and crediting the value of cryptocurrency in asset ledger 1734), or by conducting a transaction with another user (customer or merchant) of the service provider of FIG. 16 wherein the account receives incoming currency (which can be in the form associated with the account or a different form, in which the incoming currency may be converted to the form associated with the account). In some examples, the user account data 1728 can include preferences for maintaining balances of individual of the ledgers. For example, the service provider of FIG. 16 can automatically debit the fiat currency ledger 1736 to increase the asset ledger 1734, or another account associated with the user whenever the cryptocurrency balance (e.g., of the asset ledger 1734) falls below a stated level (e.g., a threshold). Conversely, in some embodiments, the service provider of FIG. 16 can automatically credit the fiat currency ledger 1736 to decrease the asset ledger 1734 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party unrelated to the service provider of FIG. 16 (i.e., an external account). In at least one example, the user can transfer all or a portion of a balance of the cryptocurrency stored in the third-party cryptocurrency wallet to the service provider of FIG. 16. Such a transaction can require the user to transfer an amount of the cryptocurrency in a message signed by user's private key to an address provided by the service provider of FIG. 16. In at least one example, the transaction can be sent to miners to bundle the transaction into a block of transactions and to verify the authenticity of the transactions in the block. Once a miner has verified the block, the block is written to a public, distributed blockchain where the service provider of FIG. 16 can then verify that the transaction has been confirmed and can credit the user's asset ledger 1734 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a merchant in store or online.

In some examples, a user can purchase cryptocurrency to fund their cryptocurrency account. In some examples, the user can purchase cryptocurrency through services offered by the service provider of FIG. 16. As described above, in some examples, the service provider of FIG. 16 can acquire cryptocurrency from a third-party source. In such examples, the asset wallet 1710 can be associated with different addresses and can vary addresses used to acquire cryptocurrency so that its holdings are represented under a variety of addresses on a blockchain. When the service provider of FIG. 16 has their own holdings of cryptocurrency, users can acquire cryptocurrency directly from the service provider of FIG. 16. In some examples, the service provider of FIG. 16 can include logic for buying and selling cryptocurrency in order to maintain a desired level of cryptocurrency. The desired level can be based on a volume of transactions over a period, balances of collective user profiles cryptocurrency ledgers, exchange rates, or trends in changing of exchange rates such that the cryptocurrency is trending towards gaining or losing value with respect to the fiat currency. In all of these examples, the buying and selling of cryptocurrency, and therefore the associated updating of the public ledger can be separate from any customer-merchant transaction, and therefore not necessarily time-sensitive.

In examples where the service provider of FIG. 16 has its own cryptocurrency assets, cryptocurrency transferred in a transaction (e.g., data with address provided for receipt of transaction and a balance of cryptocurrency transferred in the transaction) can be stored in the asset wallet 1710. In at least one example, the service provider of FIG. 16 can credit the asset ledger 1734 of the user. Additionally, while the service provider of FIG. 16 recognizes that the user retains the value of the transferred cryptocurrency through crediting the asset ledger 1734, any person that inspects the blockchain will see the cryptocurrency as having been transferred to the service provider of FIG. 16. In some examples, the asset wallet 1710 can be associated with many different addresses. In such examples, any person that inspects the blockchain may not easily associate all cryptocurrency stored in asset wallet 1710 as belonging to the same entity. It is this presence of a private ledger that is used for real-time transactions and maintained by the service provider of FIG. 16, combined with updates to the public ledger at other times, that allows for extremely fast transactions using cryptocurrency to be achieved. In some examples, the "private ledger" can refer to the asset ledger 1710, which in some examples, can utilize the private blockchain 1719, as described herein. The "public ledger" can correspond to a public blockchain associated with the asset network.

In at least one example, a user's asset ledger 1734, fiat currency ledger 1736, or the like can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1734. In some examples, a user can receive fiat currency or another currency in the form of payment for a transaction with another user. In at least one example, at least a portion of such funds can be converted into cryptocurrency by the service provider of FIG. 16 and used to fund the asset ledger 1734 of the user.

As addressed above, in some examples, users can also have other accounts maintained by the service provider of FIG. 16. For example, a user can also have an account in U.S. dollars, which can be tracked, for example, via the fiat currency ledger 1736. Such an account can be funded by transferring money from a bank account at a third-party bank to an account maintained by the service provider of FIG. 16 as is conventionally known. In some examples, a user can receive fiat currency in the form of payment for a transaction with another user. In such examples, at least a portion of such funds can be used to fund the fiat currency ledger 1736.

In some examples, a user can have one or more internal payment cards registered with the service provider of FIG. 16. Internal payment cards can be linked to one or more of the accounts associated with the user account 1720. In some embodiments, options with respect to internal payment cards can be adjusted and managed using an application (e.g., the payment application 1618).

In at least one example, as described above, each ledger can correspond to an account of the user that is managed by the service provider of FIG. 16. In at least one example, individual of the accounts can be associated with a wallet or a stored balance for use in payment transactions, peer-to-peer transactions, payroll payments, etc.

In at least one example, the user account 1720 can be associated with an asset wallet 1740. The asset wallet 1740 of the user can be associated with account information that can be stored in the user account data 1728 and, in some examples, can be associated with the user wallet key(s) 1732. In at least one example, the asset wallet 1740 can store data indicating an address provided for receipt of a cryptocurrency transaction. In at least one example, the balance of the asset wallet 1740 can be based at least in part on a balance of the asset ledger 1734. In at least one example, funds availed via the asset wallet 1740 can be stored in the asset wallet 1740 or the asset wallet 1710. Funds availed via the asset wallet 1710 can be tracked via the asset ledger 1734. The asset wallet 1740, however, can be associated with additional cryptocurrency funds.

In at least one example, when the service provider of FIG. 16 includes a private blockchain 1719 for recording and validating cryptocurrency transactions, the asset wallet 1740 can be used instead of, or in addition to, the asset ledger 1734. For example, at least one example, a merchant can provide the address of the asset wallet 1740 for receiving payments. In an example where a customer is paying in cryptocurrency and the customer has their own cryptocurrency wallet account associated with the service provider of FIG. 16, the customer can send a message signed by its private key including its wallet address (i.e., of the customer) and identifying the cryptocurrency and value to be transferred to the merchant's asset wallet 1740. The service provider of FIG. 16 can complete the transaction by reducing the cryptocurrency balance in the customer's cryptocurrency wallet and increasing the cryptocurrency balance in the merchant's asset wallet 1740. In addition to recording the transaction in the respective cryptocurrency wallets, the transaction can be recorded in the private blockchain 1719 and the transaction can be confirmed. A user can perform a similar transaction with cryptocurrency in a peer-to-peer transaction as described above. In at least one example, the cryptocurrency wallet account 1730 can be funded by a balance transfer from a third-party cryptocurrency wallet, as described above. Such a transaction can require a user to transfer an amount of cryptocurrency in a message signed by the user's private key to an address of the cryptocurrency wallet account 1730. The transferred amount of cryptocurrency can then be within the cryptocurrency wallet account 1730 for use in later transactions.

While the asset ledger 1734 and/or asset wallet 1740 are each described above with reference to cryptocurrency, the asset ledger 1734 and/or asset wallet 1740 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider of FIG. 16 is an aspect of the technology disclosed that enables technical advantages of increased processing speed and improved security.

Figure 18:
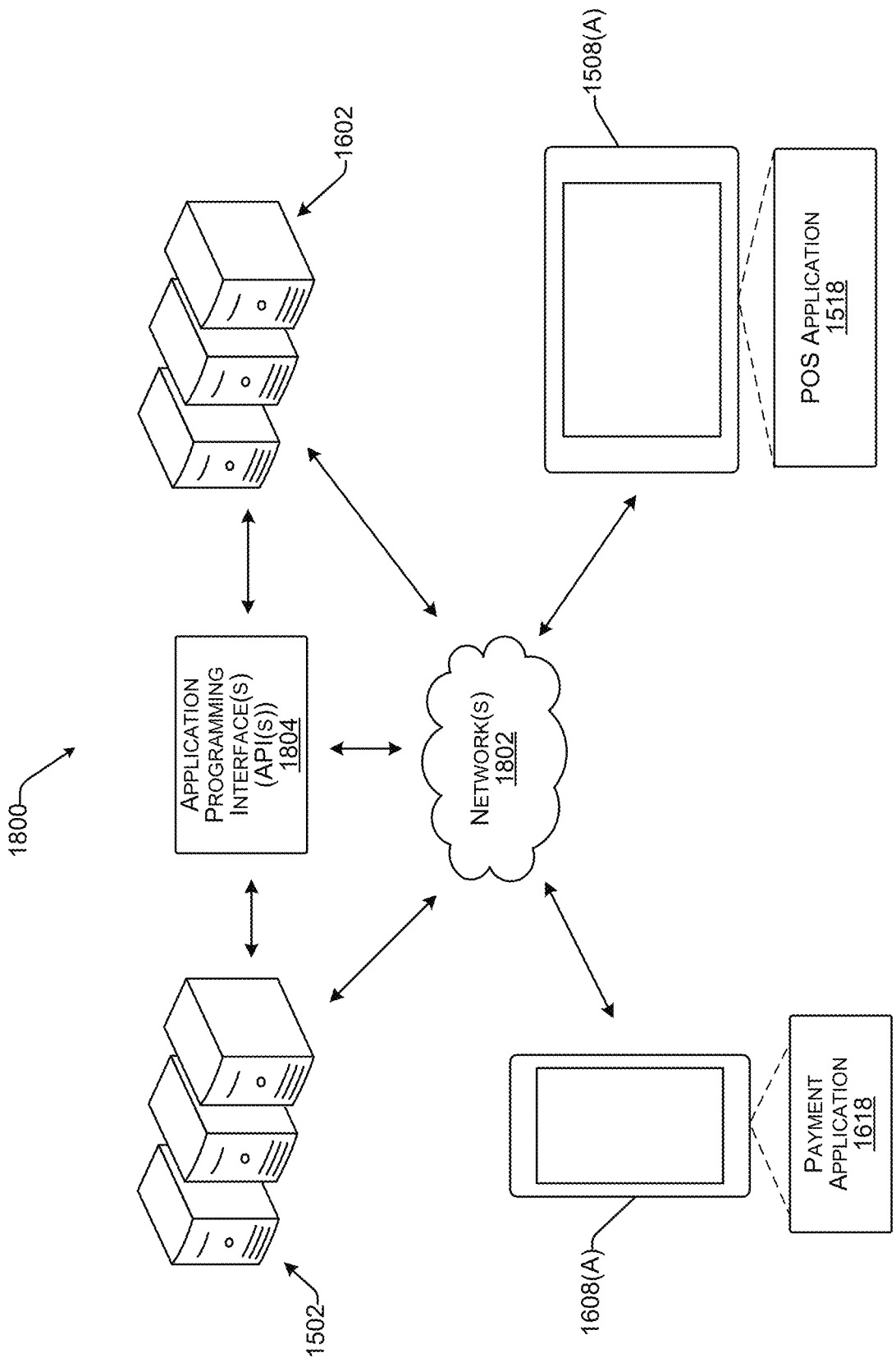
FIG. 18 shows an example of how the environments of FIGS. 15 and 16 can be integrated to enable payments at a POS using assets associated with user accounts in a peer-to-peer environment, according to an implementation of the present subject matter.

FIG. 18 illustrates an example environment 1800 wherein the environment 1500 and the environment 1600 can be integrated to enable payments at the point-of-sale using assets associated with user accounts in the peer-to-peer environment of FIG. 16. As illustrated, each of the components can communicate with one another via one or more networks 1802. In some examples, one or more APIs 1804 or other functional components can be used to facilitate such communication.

In at least one example, the example environment 1800 can enable contactless payments, via integration of peer-to-peer payment, or other payment making, platform(s) and payment processing platform(s), are described herein. For the purpose of FIG. 18, the environment 1500 can refer to a payment processing platform and the environment 1600 can refer to a peer-to-peer payment, or payment making, platform. In an example, such an integration can enable a customer to participate in a transaction via their own computing device instead of interacting with a merchant device of a merchant, such as the merchant device 1508(A). In such an example, the POS application 1518, associated with a payment processing platform and executable by the merchant device 1508(A) of the merchant, can present a Quick Response (QR) code, or other code that can be used to identify a transaction (e.g., a transaction code), in association with a transaction between the customer and the merchant. The QR code, or other transaction code, can be provided to the POS application 1518 via an API associated with the peer-to-peer payment platform. In an example, the customer can utilize their own computing device, such as the user device 1608(A), to capture the QR code, or the other transaction code, and to provide an indication of the captured QR code, or other transaction code, to server(s) 1502 and/or server(s) 1602.

Based at least in part on the integration of the peer-to-peer payment platform and the payment processing platform (e.g., via the API), the server(s) 1502 and/or 1602 associated with each can exchange communications with each other—and with a payment application 1618 associated with the peer-to-peer payment platform and/or the POS application 1518—to process payment for the transaction using a peer-to-peer payment where the customer is a first "peer" and the merchant is a second "peer." In at least one example, the peer-to-peer payment platform can transfer funds from an account of the customer, maintained by the peer-to-peer payment platform, to an account of the merchant, maintained by the payment processing platform, thereby facilitating a contactless (peer-to-peer) payment for the transaction. That is, based at least in part on receiving an indication of which payment method a user (e.g., customer or merchant) intends to use for a transaction, techniques described herein utilize an integration between a peer-to-peer payment platform and payment processing platform (which can be a first- or third-party integration) such that a QR code, or other transaction code, specific to the transaction can be used for providing transaction details, location details, customer details, or the like to a computing device of the customer, such as the user device 1608(A), to enable a contactless (peer-to-peer) payment for the transaction.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 1608(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 1518 and the payment application 1618, as described herein, can process a payment transaction by routing information input via the merchant application to the payment application for completing a "frictionless" payment. This can be referred to as "in-application payment." In another example of "in-application payment," the payment application described herein can be created or modified via a software developer kit (SDK) to enable in-application payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. In such a "scan to pay" example, a customer computing device, such as the user device 1608(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc.

In an example, a customer can desire to purchase items from a merchant. When the customer approaches the merchant to check out, the merchant (e.g., a worker associated therewith) can add indications of the items to a virtual cart via the POS application 1518, associated with a payment processing platform, on the merchant device 1508(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, a display of the merchant device 1508(A) can present a QR code, or other transaction code, that can be associated with a peer-to-peer payment platform. The customer can use a camera associated with the user device 1608(A) to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As an additional or alternative example, a customer can desire to purchase items from a merchant. When the customer approaches the merchant to check out, the merchant (e.g., a worker associated therewith) can add indications of the items to a virtual cart via the POS application 1518, associated with a payment processing platform, on the merchant device 1508(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, the POS application 1518 can cause a text message with a resource locator (e.g., uniform resource locator (URL)) that can be associated with a peer-to-peer payment platform to be sent to the user device 1608(A). The customer can interact with the resource locator and, if the customer is already associated with the peer-to-peer payment platform (e.g., has an existing account, previously onboarded, etc.), the peer-to-peer payment platform can provide an indication of the interaction with the resource locator to the payment processing platform. This interaction—between the customer and the resource locator presented via the customer computing device—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. As described above, such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

The same or similar techniques can be applicable in online and/or ecommerce selling channels as well. In such an example, a QR code, or other transaction code, can be presented via an online store/ecommerce web page of a merchant. The customer can use a camera associated with a customer computing device, such as the user device 1608(A), to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As described above, techniques described herein offer improvements to conventional payment technologies. In an example, techniques described herein can enable transaction data to be sent from a POS application 1518 of a merchant device 1508(A) at a brick-and-mortar store of a merchant to a payment application 1618 of a user device 1608(A) of a customer to enable the customer to participate in a transaction via their own computing device. For instance, in a "scan to pay" example as described above, based at least in part on capturing the QR code, or other transaction code, via the user device 1608(A), the payment processing platform can provide transaction data to the peer-to-peer payment platform for presentation via the payment application 1618 on the user device 1608(A). In some examples, the customer can watch items being added to their cart (e.g., via a user interface presented via the payment application). As an item is added to a virtual cart by the merchant—via the POS application 1518 on the merchant device 1508(A) of the merchant—the customer can see the item in their virtual cart on their own computing device in near-real time. In another example, the peer-to-peer payment platform can analyze transaction data as it is received to determine whether an incentive (e.g., a discount, a loyalty reward, prioritized access or booking, etc.) is applicable to the transaction and can automatically apply the incentive or send a recommendation to the payment application 1618 for presentation via a user interface associated therewith. In addition to enabling a customer to participate in a transaction during cart building, techniques described herein can enable a customer to complete a transaction, and in some examples, provide gratuity (i.e., a tip), feedback, loyalty information, or the like, via the user device 1608(A) during or after payment of the transaction.

In some examples, based at least in part on capturing the QR code, or other transaction code, the payment processing platform can provide transaction data to the peer-to-peer payment platform for presentation via the payment application 1618 on the computing device of the customer, such as the user device 1608(A), to enable the customer to complete the transaction via their own computing device. In some examples, in response to receiving an indication that the QR code, or other transaction code, has been captured or otherwise interacted with via the customer computing device, the peer-to-peer payment platform can determine that the customer authorizes payment of the transaction using funds associated with a stored balance of the customer that is managed and/or maintained by the peer-to-peer payment platform. Such authorization can be implicit such that the interaction with the transaction code can imply authorization of the customer. In some examples, in response to receiving an indication that the QR code, or other transaction code, has been captured or otherwise interacted with via the customer computing device, the peer-to-peer payment platform can request authorization to process payment for the transaction using the funds associated with the stored balance and the customer can interact with the payment application to authorize the settlement of the transaction. A response to such a request can provide an express authorization of the customer. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the peer-to-peer payment platform can transfer funds from the stored balance of the customer to the payment processing platform. In at least one example, the payment processing platform can deposit the funds, or a portion thereof, into a stored balance of the merchant that is managed and/or maintained by the payment processing platform. That is, techniques described herein enable the peer-to-peer payment platform to transfer funds to the payment processing platform to settle payment of the transaction. In such an example, the payment processing platform can be a "peer" to the customer in a peer-to-peer transaction.

In some examples, techniques described herein can enable the customer to interact with the transaction after payment for the transaction has been settled. For example, in at least one example, the payment processing platform can cause a total amount of a transaction to be presented via a user interface associated with the payment application 1618 such that the customer can provide gratuity, feedback, loyalty information, or the like, via an interaction with the user interface. In some examples, because the customer has already authorized payment via the peer-to-peer payment platform, if the customer inputs a tip, the peer-to-peer payment platform can transfer additional funds, associated with the tip, to the payment processing platform. This pre-authorization (or maintained authorization) of sorts can enable faster, more efficient payment processing when the tip is received. Further, the customer can provide feedback and/or loyalty information via the user interface presented by the payment application, which can be associated with the transaction.

As described above—and also below—techniques described herein enable contactless payments. That is, by integrating the payment processing platform with the peer-to-peer payment platform, merchants and customers can participate in transactions via their own computing devices without needing to touch, or otherwise be in contact, with one another. By moving aspects of a transaction that are traditionally performed on a computing device of a merchant to a computing device of a customer, customers can have more control over the transaction and can have more privacy. That is, customers can monitor items that are added to their cart to ensure accuracy. Further, customers can authorize payments, use rewards, claim incentives, add gratuity, or the like without being watched by the merchant or other customers.

In some examples, such as when the QR code, or other transaction code, is captured by the computing device of the customer prior to a payment selection user interface being presented via the POS application 1518, payment for the transaction can be pre-authorized such that when the time comes to complete the transaction, neither the payment processing platform nor the peer-to-peer payment platform need to re-authorize payment at that time. That is, techniques described herein can enable faster, more efficient transactions. Further, in some examples, when a customer adds a tip after payment for a transaction has been settled, in some examples, because the peer-to-peer payment platform has already been authorized, the peer-to-peer payment platform and the payment processing platform may not need to obtain another authorization to settle funds associated with the tip. That is, in such examples, fewer data transmissions are required and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 1618 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, instead of scanning, capturing, or otherwise interacting with a QR code or transaction code, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. For example, based at least in part on detecting a dip, tap, swipe, or the like, the payment processing platform can associate a customer with a transaction and provide at least a portion of transaction data associated with the transaction to a customer computing device associated therewith. In some examples, the payment instrument can be associated with the peer-to-peer payment platform as described herein (e.g., a debit card linked to a stored balance of a customer) such that when the payment instrument is caused to interact with a payment reader, the payment processing platform can exchange communications with the peer-to-peer payment platform to authorize payment for a transaction and/or provision associated transaction data to a computing device of the customer associated with the transaction.

Figure 19:
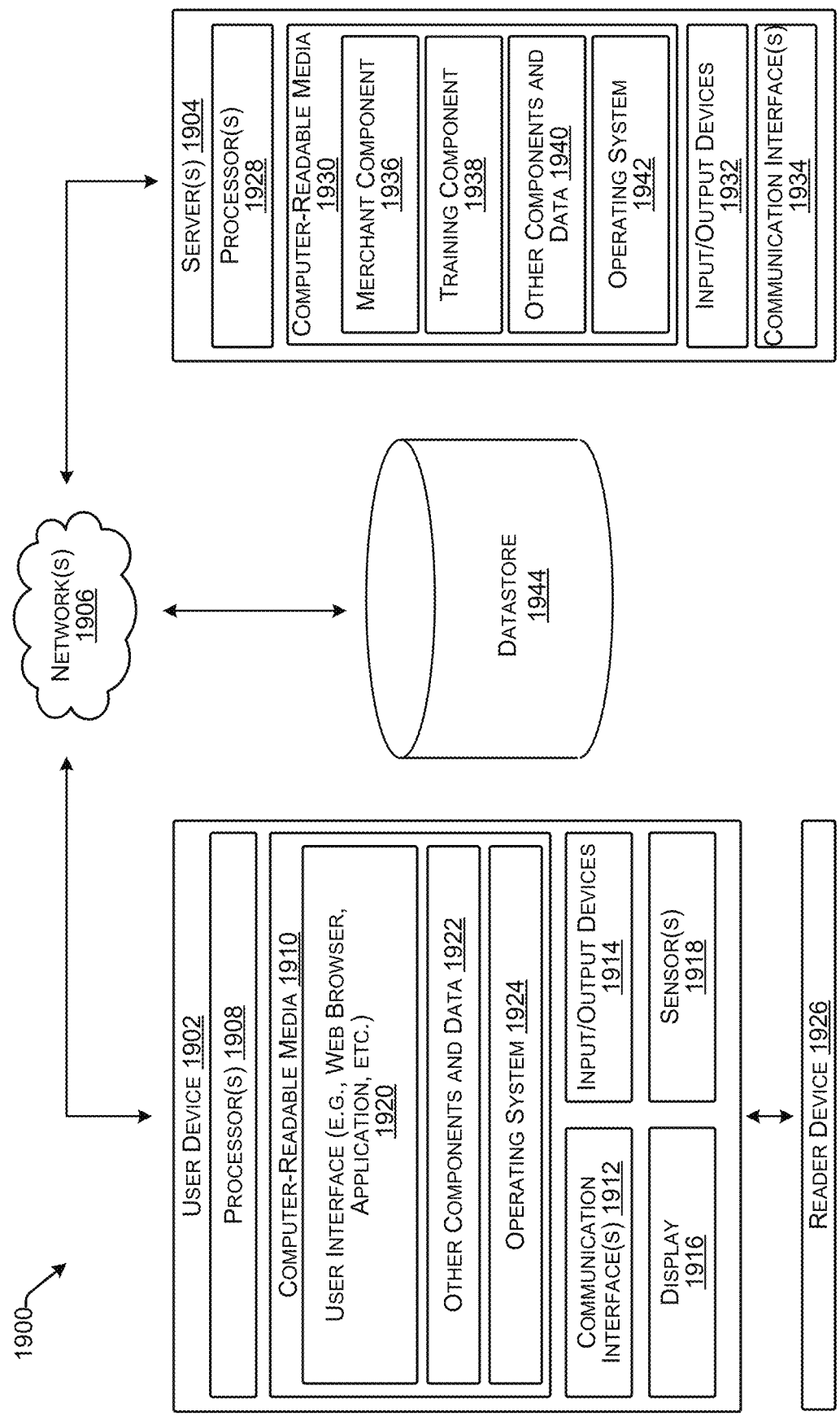
FIG. 19 is a block diagram of an example of a processing system that can be used implement the techniques described herein, according to an implementation of the present subject matter.

FIG. 19 depicts an illustrative block diagram illustrating a system 1900 for performing techniques described herein. The system 1900 includes a user device 1902, that communicates with server computing device(s) (e.g., server(s) 1904) via network(s) 1906 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1902 is illustrated, in additional or alternate examples, the system 1900 can have multiple user devices, as described above with reference to FIG. 6. The user device 1902 may represent an implementation of, for example, any one or more of devices 11 and 12 in FIG. 1 and devices 20 and 25 in FIG. 2. The server 1904 may represent, for example, an implementation of systems used to provide any one or more of the MMS 4, merchant online shopping site 28 in FIG. 2 and the CP 8 in FIGS. 1 and 2.

In at least one example, the user device 1902 can be any suitable type of computing device, e.g., portable, semi-portable, semi-stationary, or stationary. Some examples of the user device 1902 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1902 can be any computing device capable of sending communications and performing the functions according to the techniques described herein. The user device 1902 can include devices, e.g., payment card readers, or components capable of accepting payments, as described below.

In the illustrated example, the user device 1902 includes one or more processors 1908, one or more computer-readable media 1910, one or more communication interface(s) 1912, one or more input/output (I/O) devices 1914, a display 1916, and sensor(s) 1918.

In at least one example, each processor 1908 can itself comprise one or more processors or processing cores. For example, the processor(s) 1908 can be implemented as one or more microprocessors, microcomputers, microcontrollers, digital signal processors, central processing units, state machines, logic circuitries, and/or any devices that manipulate signals based on operational instructions. In some examples, the processor(s) 1908 can be one or more hardware processors and/or logic circuits of any suitable type specifically programmed or configured to execute the algorithms and processes described herein. The processor(s) 1908 can be configured to fetch and execute computer-readable processor-executable instructions stored in the computer-readable media 1910.

Depending on the configuration of the user device 1902, the computer-readable media 1910 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1910 can include, but is not limited to, RAM, ROM, EEPROM, flash memory, solid-state storage, magnetic disk storage, optical storage, and/or other computer-readable media technology. Further, in some examples, the user device 1902 can access external storage, such as RAID storage systems, storage arrays, network attached storage, storage area networks, cloud storage, or any other medium that can be used to store information and that can be accessed by the processor(s) 1908 directly or through another computing device or network. Accordingly, the computer-readable media 1910 can be computer storage media able to store instructions, components or components that can be executed by the processor(s) 1908. Further, when mentioned, non-transitory computer-readable media exclude media such as energy, carrier signals, electromagnetic waves, and signals per se.

The computer-readable media 1910 can be used to store and maintain any number of functional components that are executable by the processor(s) 1908. In some implementations, these functional components comprise instructions or programs that are executable by the processor(s) 1908 and that, when executed, implement operational logic for performing the actions and services attributed above to the user device 1902. Functional components stored in the computer-readable media 1910 can include a user interface 1920 to enable users to interact with the user device 1902, and thus the server(s) 1904 and/or other networked devices. In at least one example, the user interface 1920 can be presented via a web browser, or the like. In other examples, the user interface 1920 can be presented via an application, such as a mobile application or desktop application, which can be provided by a service provider associated with the server(s) 1904, or which can be an otherwise dedicated application. In at least one example, a user can interact with the user interface via touch input, spoken input, gesture, or any other type of input. The word "input" is also used to describe "contextual" input that may not be directly provided by the user via the user interface 1920. For example, user's interactions with the user interface 1920 are analyzed using, e.g., natural language processing techniques, to determine context or intent of the user, which may be treated in a manner similar to "direct" user input.

Depending on the type of the user device 1902, the computer-readable media 1910 can also optionally include other functional components and data, such as other components and data 1922, which can include programs, drivers, etc., and the data used or generated by the functional components. In addition, the computer-readable media 1910 can also store data, data structures and the like, that are used by the functional components. Further, the user device 1902 can include many other logical, programmatic and physical components, of which those described are merely examples that are related to the discussion herein.

In at least one example, the computer-readable media 1910 can include additional functional components, such as an operating system 1924 for controlling and managing various functions of the user device 1902 and for enabling basic user interactions.

The communication interface(s) 1912 can include one or more interfaces and hardware components for enabling communication with various other devices, such as over the network(s) 1906 or directly. For example, communication interface(s) 1912 can enable communication through one or more network(s) 1906, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1906 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1902 can further include one or more input/output (I/O) devices 1914. The I/O devices 1914 can include speakers, a microphone, a camera, and various user controls (e.g., buttons, a joystick, a keyboard, a keypad, etc.), a haptic output device, and so forth. The I/O devices 1914 can also include attachments that leverage the accessories (audio-jack, USB-C, Bluetooth, etc.) to connect with the user device 1902.

In at least one example, user device 1902 can include a display 1916. Depending on the type of computing device(s) used as the user device 1902, the display 1916 can employ any suitable display technology. For example, the display 1916 can be a liquid crystal display, a plasma display, a light emitting diode display, an OLED (organic light-emitting diode) display, an electronic paper display, or any other suitable type of display able to present digital content thereon. In at least one example, the display 1916 can be an augmented reality display, a virtually reality display, or any other display able to present and/or project digital content. In some examples, the display 1916 can have a touch sensor associated with the display 1916 to provide a touchscreen display configured to receive touch inputs for enabling interaction with a graphic interface presented on the display 1916. Accordingly, implementations herein are not limited to any particular display technology. Alternatively, in some examples, the user device 1902 may not include the display 1916, and information can be presented by other means, such as aurally, haptically, etc.

In addition, the user device 1902 can include sensor(s) 1918. The sensor(s) 1918 can include a GPS device able to indicate location information. Further, the sensor(s) 1918 can include, but are not limited to, an accelerometer, gyroscope, compass, proximity sensor, camera, microphone, and/or a switch.

In some example, the GPS device can be used to identify a location of a user. In at least one example, the location of the user can be used by the service provider, described above, to provide one or more services. That is, in some examples, the service provider can implement geofencing to provide particular services to users. As an example, with a lending service, location can be used to confirm that a stated purpose of a loan corresponds to evidence of use (e.g., Is the user using the loan consistent with what the user said the user was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users and/or for sending users notifications regarding available appointments with merchant(s) located proximate to the users. In at least one example, location can be used for taking payments from nearby customers when they leave a geofence, or location can be used to initiate an action responsive to users 614 enter a brick-and-mortar store of a merchant. Location can be used in additional or alternative ways as well.

Additionally, the user device 1902 can include various other components that are not shown, examples of which include removable storage, a power source, such as a battery and power control unit, a barcode scanner, a printer, a cash drawer, and so forth.

In addition, in some examples, the user device 1902 can include, be connectable to, or otherwise be coupled to a reader device 1926, for reading payment instruments and/or identifiers associated with payment objects. In some examples, as described above, the reader device 1926 can plug in to a port in the user device 1902, such as a microphone port, a headphone port, an audio-jack, a data port, or other suitable port. In additional or alternative examples, the reader device 1926 can be coupled to the user device 1902 via another wired or wireless connection, such as via a Bluetooth®, BLE, and so on. The reader device 1926 can include a read head for reading a magnetic strip of a payment card, and further can include encryption technology for encrypting the information read from the magnetic strip. Additionally or alternatively, the reader device 1926 can be an EMV payment reader, which in some examples, can be embedded in the user device 1902. Moreover, numerous other types of readers can be employed with the user device 1902 herein, depending on the type and configuration of the user device 1902.

The reader device 1926 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1926 may include hardware implementation, such as slots, magnetic tracks, and rails with one or more sensors or electrical contacts to facilitate detection and acceptance of a payment instrument. That is, the reader device 1926 may include hardware implementations to enable the reader device 1926 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1926 may also include a biometric sensor to receive and process biometric characteristics and process them as payment instruments, given that such biometric characteristics are registered with the payment service and connected to a financial account with a bank server.

The reader device 1926 may include processing unit(s), computer-readable media, a reader chip, a transaction chip, a timer, a clock, a network interface, a power supply, and so on. The processing unit(s) of the reader device 1926 may execute one or more components and/or processes to cause the reader device 1926 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 1926, the computer-readable media may include volatile memory (such as RAM), non-volatile memory (such as ROM, flash memory, miniature hard drive, memory card, or the like), or some combination thereof. In at least one example, the computer-readable media of the reader device 1926 may include at least one component for performing various functions as described herein.

The reader chip may perform functionalities to control the operations and processing of the reader device 1926. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock, which may provide a clock signal indicating a time. Furthermore, the reader chip may perform functionality to control the network interface, which may interface with the network(s) 1906, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1926. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 1902, which can be a POS terminal, and the reader device 1926 are shown as separate devices, in additional or alternative examples, the user device 1902 and the reader device 1926 can be part of a single device, which may be a battery-operated device. In such an example, components of both the user device 1902 and the reader device 1926 may be associated with the single device. In some examples, the reader device 1926 can have a display integrated therewith, which can be in addition to (or as an alternative of) the display 1916 associated with the user device 1902.

The server(s) 1904 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1904 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1904 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1904 can include one or more processors 1928, one or more computer-readable media 1930, one or more I/O devices 1932, and one or more communication interfaces 1934. Each processor 1928 can be a single processing unit or a number of processing units, and can include single or multiple computing units or multiple processing cores. The processor(s) 1928 can be implemented as one or more microprocessors, microcomputers, microcontrollers, digital signal processors, central processing units, state machines, logic circuitries, and/or any devices that manipulate signals based on operational instructions. For example, the processor(s) 1928 can be one or more hardware processors and/or logic circuits of any suitable type specifically programmed or configured to execute the algorithms and processes described herein. The processor(s) 1928 can be configured to fetch and execute computer-readable instructions stored in the computer-readable media 1930, which can program the processor(s) 1928 to perform the functions described herein.

The computer-readable media 1930 can include volatile and nonvolatile memory and/or removable and non-removable media implemented in any type of technology for storage of information, such as computer-readable instructions, data structures, program components, or other data. Such computer-readable media 1930 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1904, the computer-readable media 1930 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1930 can be used to store any number of functional components that are executable by the processor(s) 1928. In many implementations, these functional components comprise instructions or programs that are executable by the processors 1928 and that, when executed, specifically configure the one or more processors 1928 to perform the actions attributed above to the service provider and/or payment processing service. Functional components stored in the computer-readable media 1930 can optionally include a merchant component 1936, a training component 1938, and one or more other components and data 1940.

The merchant component 1936 can be configured to receive transaction data from POS systems, such as the merchant interface 31 described above with reference to FIG. 3 and/or the POS system 5 described above with reference to FIG. 1. The merchant component 1936 can transmit requests (e.g., authorization, capture, settlement, etc.) to payment service server computing device(s) to facilitate POS transactions between merchants and customers. The merchant component 1936 can communicate the successes or failures of the POS transactions to the POS systems.

The training component 1938 can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1902 and/or the server(s) 1904 for use at a time after the data models have been trained (e.g., at runtime).

The one or more other components and data 1922 or 1940 can include, for example, the customer interface 32 and/or other elements of the MMS 4, the functionalities of which are described above. Further, the one or more other components and data 1940 can include programs, drivers, etc., and the data used or generated by the functional components. Further, the server(s) 1904 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they that may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1930 can additionally include an operating system 1942 for controlling and managing various functions of the server(s) 1904.

The communication interface(s) 1934 can include one or more interfaces and hardware components for enabling communication with various other devices, such as over the network(s) 1906 or directly. For example, communication interface(s) 1934 can enable communication through one or more network(s) 1906, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1906 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1904 can further be equipped with various I/O devices 1932. Such I/O devices 1932 can include a display, various user interface controls (e.g., buttons, joystick, keyboard, mouse, touch screen, biometric or sensory input devices, etc.), audio speakers, connection ports and so forth.

In at least one example, the system 1900 can include a datastore 1944 that can be configured to store data that is accessible, manageable, and updatable. In some examples, the datastore 1944 can be integrated with the user device 1902 and/or the server(s) 1904. In other examples, as shown in FIG. 19, the datastore 1944 can be located remotely from the server(s) 1904 and can be accessible to the server(s) 1904. The datastore 1944 can comprise multiple databases and/or servers connected locally and/or remotely via the network(s) 1906.

In at least one example, the datastore 1944 can store user profiles, which can include merchant profiles, customer profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

Furthermore, in at least one example, the datastore 1944 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1944 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

The machine-implemented operations described above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, means: a) special-purpose hardwired circuitry, such as one or more application-specific integrated circuits (ASICs), programmable logic devices (PLDs), field programmable gate arrays (FPGAs), or other similar device(s); b) programmable circuitry programmed with software and/or firmware, such as one or more programmed general-purpose microprocessors, digital signal processors (DSPs) and/or microcontrollers, system-on-a-chip systems (SOCs), or other similar device(s); or c) a combination of the forms mentioned in a) and b).

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method comprising:
   accessing, by a point of sale (POS) application located at a physical location, a special-purpose computing device configured as a POS terminal that includes a reader device that is capable of accepting a plurality of payment instruments and a user interface associated with a streaming media service, by implementing an application programming interface (API) of the streaming media service, the user interface indicating a plurality of selectable media content items;
   receiving, by the POS application, inputs specifying a music playlist of media content items from the plurality of selectable media content items;
   causing, by the POS application, the streaming media service to generate the music playlist in response to the inputs;
   establishing a geo-fence that corresponds to a virtual geographic boundary of the physical location as defined by a radiofrequency-based technology that triggers a response when a mobile device enters or leaves the physical location;
   determining, based on the geo-fence, that a particular mobile device associated with a user is present at the physical location;
   in response to determining that the particular mobile device is present at the physical location, enabling the user to access the music playlist via a web interface presented at the particular mobile device, wherein the particular mobile device is a different device than the POS terminal and wherein enabling the user to access the music playlist via the web interface includes providing, by a machine-learning model, a recommendation of additional media items to the user based on a listening history associated with the user, wherein the machine-learning model is trained to output the recommendation;
   receiving, from the particular mobile device, a playlist access request indicative of a request from the user to access the music playlist, wherein the playlist access request is received in response to the user scanning a QR code with the particular mobile device or the user selecting a hyperlink on the particular mobile device;
   surfacing the music playlist onto the particular mobile device in response to the playlist access request, to enable the user to view the music playlist while the user is present at the physical location;
   receiving, from the particular mobile device, a playback request representing a selection by the user of a media content item on the music playlist, while the particular mobile device is present at the physical location;
   causing the selected media content item from the music playlist to be placed in a playback queue, for audible playback at the physical location by a playback system associated with the physical location, based on the playback request, wherein the playback system is different from the particular mobile device;
   after causing the selected media content item to be placed in the playback queue, determining, based on the geo-fence, that the particular mobile device is not present at the physical location; and
   in response to determining that the particular mobile device is not present at the physical location, removing the selected media content item from the playback queue.

2. The method of claim 1, further comprising, in response to the playback request, adding a payment amount, associated with playback of the selected media content item, to an amount owed by the user to a merchant associated with the POS application at the physical location.

3. The method of claim 1, wherein the API is a first API and enabling the user to access the music playlist via the web interface implementing the first API or a second API of the streaming media service to obtain a list of the media content items in the playlist.

4. The method of claim 1, further comprising:
   in response to the playback request, creating, by the web interface, an order for playback of the selected media content item, the order including an indication of the selected media content item;
   providing the order from the web interface to the POS application;
   processing, by the POS application, a payment from the user to an entity associated with the POS application, for playback of the selected media content item, based on the order; and
   causing playback of the selected media content item from the music playlist by the playback system associated with the physical location in response to successful completion of processing the payment.

5. The method of claim 1, further comprising, in response to the playback request, adding a payment amount, associated with playback of the selected media content item, to an amount owed by the user at the physical location.

6. The method of claim 1, further comprising:
   executing a condition engine to govern access to the music playlist based on one or more predetermined parameters.

7. The method of claim 1, wherein determining, based on the geo-fence, that the particular mobile device is not present at the physical location includes:
   executing a condition engine to evaluate a condition relating to interaction with the geo-fence associated with the physical location and to remove access to the music playlist based on the interaction with the geo-fence in response to determining that the particular mobile device is not present at the physical location.

8. A system comprising:
a processor; and
one or more computer-readable media, coupled to the processor:
a point of sale (POS) application at a physical location that is stored in the one or more computer-readable media and executable by the processor, the POS application operable to perform operations including:
   accessing a special-purpose computing device that is configured as a POS terminal that includes a reader device that is capable of accepting a plurality of payment instruments and a user interface associated with a streaming media service by implementing an application programming interface (API) of the streaming media service, the user interface indicating a plurality of selectable media content items;
   receiving inputs specifying a music playlist of media content items from the plurality of selectable media content items;
   causing the streaming media service to generate the music playlist in response to the inputs;
   establishing a geo-fence that corresponds to a virtual geographic boundary of the physical location as defined by a radiofrequency-based technology that triggers a response when a mobile device enters or leaves the physical location;
   determining that a particular mobile device associated with a user is present at the physical location;
   in response to determining that the particular mobile device is present at the physical location, enabling the user to access the music playlist via a web interface presented at the particular mobile device, wherein the particular mobile device is a different device than the POS terminal and wherein enabling the user to access the music playlist via the web interface includes providing, by a machine-learning model, a recommendation of additional media items to the user based on a listening history associated with the user, wherein the machine-learning model is trained to output the recommendation;
   receiving, from the particular mobile device, a playlist access request indicative of a request from the user to access the music playlist, wherein the playlist access request is received in response to the user scanning a QR code with the particular mobile device or the user selecting a hyperlink on the particular mobile device;
   surfacing the music playlist onto the particular mobile device in response to the playlist access request, to enable the user to view the music playlist while the user is present at the physical location;
   receiving, from the particular mobile device, a playback request representing a selection by the user of a media content item on the music playlist, while the particular mobile device is present at the physical location;
   causing the selected media content item from the music playlist to be placed in a playback queue, for audible playback at the physical location by a playback system associated with the physical location, based on the playback request, wherein the playback system is different from the particular mobile device;
   after causing the selected media content item to be placed in the playback queue, determining, based on the geo-fence, that the particular mobile device is not present at the physical location; and
   in response to determining that the particular mobile device is not present at the physical location, removing the selected media content item from the playback queue.

9. The system of claim 8, further comprising, in response to the playback request, adding a payment amount, associated with playback of the selected media content item, to an amount owed by the user to a merchant associated with the POS application at the physical location.

10. The system of claim 8, wherein the API is a first API and enabling the user to access the music playlist via the web interface implementing the first API or a second API of the streaming media service to obtain a list of the media content items in the playlist.

11. The system of claim 8, wherein the operations further include:
   in response to the playback request, creating, by the web interface, an order for playback of the selected media content item, the order including an indication of the selected media content item;
   providing the order from the web interface to the POS application;
   processing, by the POS application, a payment from the user to an entity associated with the POS application, for playback of the selected media content item, based on the order; and
   causing playback of the selected media content item from the music playlist by the playback system associated with the physical location in response to successful completion of processing the payment.

12. The system of claim 8, wherein the operations further include, in response to the playback request, adding a payment amount, associated with playback of the selected media content item, to an amount owed by the user at the physical location.

13. The system of claim 8, wherein the operations further include:
   executing a condition engine to govern access to the music playlist based on one or more predetermined parameters.

14. The system of claim 8, wherein determining, based on the geo-fence, that the particular mobile device is not present at the physical location includes:
   executing a condition engine to evaluate a condition relating to interaction with the geo-fence associated with the physical location and to remove access to the music playlist based on the interaction with the geo-fence in response to determining that the particular mobile device is not present at the physical location.

15. A non-transitory computer-readable medium with instructions stored thereon that, when executed by one or more computers, cause the one or more computers to perform or control performance of operations, the operations comprising:
   accessing, by a point of sale (POS) application located at a physical location, a special-purpose computing device configured as a POS terminal that includes a reader device that is capable of accepting a plurality of payment instruments and a user interface associated with a streaming media service, by implementing an application programming interface (API) of the streaming media service, the user interface indicating a plurality of selectable media content items;
   receiving, by the POS application inputs specifying a music playlist of media content items from the plurality of selectable media content items;

causing, by the POS application, the streaming media service to generate the music playlist in response to the inputs;

establishing a geo-fence that corresponds to a virtual geographic boundary of the physical location as defined by a radiofrequency-based technology that triggers a response when a mobile device enters or leaves the physical location;

determining, based on the geo-fence, that a particular mobile device associated with a user is present at the physical location;

in response to determining that the particular mobile device is present at the physical location, enabling the user to access the music playlist via a web interface presented at the particular mobile device, wherein the particular mobile device is a different device than the POS terminal and wherein enabling the user to access the music playlist via the web interface includes providing, by a machine-learning model, a recommendation of additional media items to the user based on a listening history associated with the user, wherein the machine-learning model is trained to output the recommendation;

receiving, from the particular mobile device, a playlist access request indicative of a request from the user to access the music playlist, wherein the playlist access request is received in response to the user scanning a QR code with the particular mobile device or the user selecting a hyperlink on the particular mobile device;

surfacing the music playlist onto the particular mobile device in response to the playlist access request, to enable the user to view the music playlist while the user is present at the physical location;

receiving, from the particular mobile device, a playback request representing a selection by the user of a media content item on the music playlist, while the particular mobile device is present at the physical location;

causing the selected media content item from the music playlist to be placed in a playback queue, for audible playback at the physical location by a playback system associated with the physical location, based on the playback request, wherein the playback system is different from the particular mobile device;

after causing the selected media content item to be placed in the playback queue, determining, based on the geo-fence, that the particular mobile device is not present at the physical location; and in response to determining that the particular mobile device is not present at the physical location, removing the selected media content item from the playback queue.

16. The non-transitory computer-readable medium of claim 15, further comprising, in response to the playback request, adding a payment amount, associated with playback of the selected media content item, to an amount owed by the user to a merchant associated with the POS application at the physical location.

17. The non-transitory computer-readable medium of claim 15, wherein the API is a first API and enabling the user to access the music playlist via the web interface implementing the first API or a second API of the streaming media service to obtain a list of the media content items in the playlist.

18. The non-transitory computer-readable medium of claim 15, wherein the operations further include:

in response to the playback request, creating, by the web interface, an order for playback of the selected media content item, the order including an indication of the selected media content item;

providing the order from the web interface to the POS application;

processing, by the POS application, a payment from the user to an entity associated with the POS application, for playback of the selected media content item, based on the order; and causing playback of the selected media content item from the music playlist by the playback system associated with the physical location in response to successful completion of processing the payment.

19. The non-transitory computer-readable medium of claim 15, wherein the operations further include, in response to the playback request, adding a payment amount, associated with playback of the selected media content item, to an amount owed by the user at the physical location.

20. The non-transitory computer-readable medium of claim 15, wherein the operations further include:

executing a condition engine to govern access to the music playlist based on one or more predetermined parameters.

* * * * *